United States Patent
Ikuta et al.

(10) Patent No.: US 10,092,829 B2
(45) Date of Patent: *Oct. 9, 2018

(54) ATTACHMENT

(71) Applicant: NINTENDO CO., LTD., Kyoto (JP)

(72) Inventors: Hiroki Ikuta, Kyoto (JP); Hironori Furuike, Kyoto (JP); Hitoshi Tsuchiya, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/446,346

(22) Filed: Mar. 1, 2017

(65) Prior Publication Data

US 2018/0099218 A1    Apr. 12, 2018

(30) Foreign Application Priority Data

Oct. 6, 2016  (JP) .................................. 2016-198338
Dec. 21, 2016 (JP) .................................. 2016-248016

(51) Int. Cl.
| A63F 13/24 | (2014.01) |
| A63F 13/20 | (2014.01) |
| A63F 13/98 | (2014.01) |

(52) U.S. Cl.
CPC .............. *A63F 13/24* (2014.09); *A63F 13/20* (2014.09); *A63F 13/98* (2014.09)

(58) Field of Classification Search
CPC ...................................................... A63F 13/24
See application file for complete search history.

(56) References Cited

U.S. PATENT DOCUMENTS

| 5,276,733 | A | 1/1994 | Uno et al. |
| 5,515,174 | A | 5/1996 | Abe et al. |
| 5,627,974 | A | 5/1997 | Watts |
| 5,657,459 | A | 8/1997 | Yanagisawa et al. |
| 5,667,220 | A | 9/1997 | Cheng |

(Continued)

FOREIGN PATENT DOCUMENTS

| CN | 104 436 646 | 3/2015 |
| EP | 2 310 481 | 8/1997 |

(Continued)

OTHER PUBLICATIONS

European Search Report dated Feb. 23, 2017, issued in EP 16173843.0 (11 pages).

(Continued)

*Primary Examiner* — William H McCulloch, Jr.
*Assistant Examiner* — Yingchuan Zhang
(74) *Attorney, Agent, or Firm* — Nixon & Vanderhye P.C.

(57) ABSTRACT

An example attachment is attachable to a game controller including a controller-side slide portion on which a controller-side operation button is provided. The attachment includes a strap and an attachment-side slide portion, the attachment-side slide portion having a first side and a second side opposite to each other in a predetermined slide direction. The attachment-side slide portion is provided on a first surface of the attachment, wherein the attachment-side slide portion is configured to slidably engage with the controller-side slide portion in the predetermined slide direction. The controller-side slide portion is insertable into the attachment-side slide portion from the first side.

24 Claims, 25 Drawing Sheets

(56) References Cited

U.S. PATENT DOCUMENTS

| | | | |
|---|---|---|---|
| 5,702,305 | A | 12/1997 | Norman et al. |
| 6,512,511 | B2 | 1/2003 | Willner |
| 6,530,838 | B2 | 3/2003 | Ha |
| 6,580,420 | B1 | 6/2003 | Wang |
| 6,788,285 | B2 | 9/2004 | Paolucci |
| 7,095,442 | B2 | 8/2006 | Van Zee |
| 7,733,637 | B1 | 6/2010 | Lam |
| 7,833,097 | B1 | 11/2010 | Maddox |
| 8,298,084 | B2 | 10/2012 | Yee |
| 8,497,659 | B2 | 7/2013 | Navid |
| 8,845,425 | B2 | 9/2014 | Nogami |
| 8,939,838 | B2 | 1/2015 | Alten |
| 8,972,617 | B2 | 3/2015 | Hirschman |
| 2001/0045938 | A1 | 11/2001 | Willner |
| 2002/0119819 | A1 | 8/2002 | Kunzle |
| 2002/0145590 | A1 | 10/2002 | Paolucci et al. |
| 2002/0167696 | A1 | 11/2002 | Edwards et al. |
| 2003/0083130 | A1 | 5/2003 | Toyoshima |
| 2003/0100263 | A1 | 5/2003 | Tanaka et al. |
| 2003/0100340 | A1 | 5/2003 | Cupps et al. |
| 2003/0109314 | A1 | 6/2003 | Ku |
| 2004/0082361 | A1 | 4/2004 | Rajagopalan |
| 2004/0263471 | A1 | 12/2004 | Hsieh |
| 2005/0012711 | A1 | 1/2005 | Paolucci et al. |
| 2005/0085301 | A1 | 4/2005 | Hammond |
| 2006/0117623 | A1 | 6/2006 | Watanabe |
| 2006/0152484 | A1 | 7/2006 | Rolus |
| 2006/0176277 | A1 | 8/2006 | Daniel et al. |
| 2006/0237209 | A1 | 10/2006 | Horinouchi |
| 2006/0279039 | A1 | 12/2006 | Krieger |
| 2007/0021210 | A1 | 1/2007 | Tachibana |
| 2007/0045392 | A1 | 3/2007 | Youens |
| 2007/0111801 | A1 | 5/2007 | Haber |
| 2007/0112989 | A1 | 5/2007 | Iwaki |
| 2007/0178966 | A1 | 8/2007 | Pohlman |
| 2007/0218988 | A1 | 9/2007 | Lucich |
| 2007/0293318 | A1 | 12/2007 | Tetterington |
| 2008/0002350 | A1 | 1/2008 | Farrugia |
| 2008/0015017 | A1 | 1/2008 | Ashida et al. |
| 2008/0153593 | A1 | 6/2008 | Ikeda |
| 2009/0005164 | A1 | 1/2009 | Chang |
| 2009/0036189 | A1 | 2/2009 | Wang |
| 2009/0069096 | A1 | 3/2009 | Nishimoto |
| 2009/0070093 | A1 | 3/2009 | Nakanishi et al. |
| 2009/0072784 | A1 | 3/2009 | Erickson |
| 2009/0079705 | A1 | 3/2009 | Sizelove |
| 2009/0093307 | A1 | 4/2009 | Miyaki |
| 2009/0111508 | A1 | 4/2009 | Yeh |
| 2009/0291760 | A1 | 11/2009 | Hepburn |
| 2009/0318227 | A1 | 12/2009 | Nakajima |
| 2010/0009754 | A1 | 1/2010 | Shimamura et al. |
| 2010/0064883 | A1 | 3/2010 | Gynes |
| 2010/0118195 | A1 | 5/2010 | Eom |
| 2010/0195279 | A1 | 8/2010 | Michael |
| 2010/0216547 | A1 | 8/2010 | Coppard et al. |
| 2010/0267454 | A1 | 10/2010 | Navid |
| 2010/0304873 | A1 | 12/2010 | Markowitz et al. |
| 2011/0216495 | A1 | 9/2011 | Marx |
| 2011/0230261 | A1 | 9/2011 | Kim |
| 2011/0260969 | A1 | 10/2011 | Workman |
| 2012/0058821 | A1 | 3/2012 | Lan |
| 2012/0088582 | A1 | 4/2012 | Wu et al. |
| 2012/0106041 | A1 | 5/2012 | Ashida et al. |
| 2012/0113034 | A1 | 5/2012 | McDermid |
| 2012/0176369 | A1 | 7/2012 | Suzuki et al. |
| 2012/0188691 | A1 | 7/2012 | Zhou |
| 2012/0202597 | A1 | 8/2012 | Yee et al. |
| 2012/0271967 | A1 | 10/2012 | Hirschman |
| 2012/0302347 | A1 | 11/2012 | Nicholson |
| 2012/0302348 | A1 | 11/2012 | Karacal et al. |
| 2012/0326984 | A1 | 12/2012 | Ghassabian |
| 2013/0058659 | A1 | 3/2013 | Umezu et al. |
| 2013/0095925 | A1 | 4/2013 | Xu |
| 2013/0106687 | A1 | 5/2013 | Baum et al. |
| 2013/0109476 | A1 | 5/2013 | Baum et al. |
| 2013/0120258 | A1 | 5/2013 | Maus |
| 2013/0154542 | A1 | 6/2013 | Joynes et al. |
| 2013/0194190 | A1 | 8/2013 | Lysenko |
| 2013/0267322 | A1 | 10/2013 | South |
| 2013/0279106 | A1 | 10/2013 | Ergun |
| 2013/0335904 | A1 | 12/2013 | Griffin |
| 2014/0121023 | A1 | 5/2014 | Tahara et al. |
| 2014/0200085 | A1 | 7/2014 | Bares |
| 2014/0206451 | A1 | 7/2014 | Helmes |
| 2014/0221098 | A1 | 8/2014 | Boulanger |
| 2014/0235359 | A1 | 8/2014 | Navid |
| 2014/0247246 | A1 | 9/2014 | Maus |
| 2014/0274394 | A1 | 9/2014 | Willis |
| 2014/0370988 | A1* | 12/2014 | Shimamura ............ A63F 13/10 463/37 |
| 2015/0018101 | A1 | 1/2015 | Schoenith et al. |
| 2015/0084900 | A1 | 3/2015 | Hodges |
| 2015/0149668 | A1 | 5/2015 | Joynes et al. |
| 2015/0281422 | A1 | 10/2015 | Kessler |
| 2016/0107082 | A1 | 4/2016 | Song |
| 2016/0149426 | A1 | 5/2016 | Hodges |
| 2016/0231773 | A1 | 8/2016 | Inoue et al. |
| 2016/0361627 | A1 | 12/2016 | Fujita et al. |
| 2016/0361632 | A1 | 12/2016 | Fujita et al. |
| 2016/0361633 | A1 | 12/2016 | Fujita et al. |
| 2016/0361640 | A1 | 12/2016 | Iwao et al. |
| 2016/0361641 | A1 | 12/2016 | Koizumi et al. |
| 2017/0052750 | A1 | 2/2017 | Koizumi et al. |

FOREIGN PATENT DOCUMENTS

| | | |
|---|---|---|
| EP | 1 759 745 | 3/2007 |
| EP | 2 018 030 | 1/2009 |
| EP | 2 258 456 | 12/2010 |
| EP | 2 772 825 | 9/2014 |
| GB | 2522008 | 7/2015 |
| JP | 63-53873 | 3/1988 |
| JP | 06-077387 | 10/1994 |
| JP | 2002-182856 | 6/2002 |
| JP | 3089139 U | 7/2002 |
| JP | 2003-18275 | 1/2003 |
| JP | 2003-140811 | 5/2003 |
| JP | 2004-313492 | 11/2004 |
| JP | 2007-054114 | 3/2007 |
| JP | 4255510 | 4/2009 |
| JP | 2010-020742 | 1/2010 |
| JP | 2011-108256 | 6/2011 |
| JP | 2013-054548 | 3/2013 |
| JP | 2013-128744 | 7/2013 |
| JP | 2014-89578 A | 5/2014 |
| KR | 2003-0021435 | 3/2003 |
| WO | 2013/095703 | 6/2013 |
| WO | 2015/006680 | 1/2015 |
| WO | 2015/014663 | 2/2015 |
| WO | 2017/088739 A1 | 6/2017 |

OTHER PUBLICATIONS

Iwao, Office Action dated Mar. 13, 2017, issued in U.S. Appl. No. 15/428,188 (17 pages).
Extended European Search Report dated Nov. 8, 2017, issued in corresponding EP Application No. 17188271.5 (9 pages).
European Search Report dated Dec. 8, 2017, issued in corresponding European Application No. 17191339.5 (5 pages).
Office Action dated Dec. 5, 2017 issued in U.S. Appl. No. 15/344,208 (24 pgs.).
Office Action dated Sep. 26, 2017 issued in U.S. Appl. No. 15/418,426 (14 pgs.).
Office Action dated Jun. 2, 2017 issued in co-pending U.S. Appl. No. 15/418,456 (20 pgs.).
Koizumi, Office Action dated May 18, 2017, issued in corresponding U.S. Appl. No. 15/344,208, filed Nov. 4, 2016 (16 pages).
Koizumi, Office Action dated May 19, 2017, issued in corresponding U.S. Appl. No. 15/344,276, filed Nov. 4, 2016 (13 pages).
O-iPower, Sony Official Cradle, Jan. 2, 2015, https://www.youtube.com/watch?v=1ly5pOxOPmU, (1 page).

(56) References Cited

OTHER PUBLICATIONS

Koizumi et al., U.S. Appl. No. 15/179,022, filed Jun. 10, 2016 (210 pages).
Koizumi et al., U.S. Appl. No. 15/344,208, filed Nov. 4, 2016 (199 pages).
Koizumi et al., U.S. Appl. No. 15/344,276, filed Nov. 4, 2016 (197 pages).
Koizumi et al., U.S. Appl. No. 15/418,426, filed Jan. 27, 2017 (200 pages).
Fujita et al., U.S. Appl. No. 15/178,972, filed Jun. 10, 2016 (320 pages).
Fujita et al., U.S. Appl. No. 15/411,156, filed Jan. 20, 2017 (320 pages).
Iwao et al., U.S. Appl. No. 15/178,984, filed Jun. 10, 2016 (358 pages).
Iwao et al., U.S. Appl. No. 15/428,188, filed Feb. 9, 2017 (351 pages).
Fujita et al., U.S. Appl. No. 15/179,011, filed Jun. 10, 2016 (323 pages).
Fujita et al., U.S. Appl. No. 15/178,991, filed Jun. 10, 2016 (321 pages).
Fujita et al., U.S. Appl. No. 15/413,977, filed Jan. 24, 2017 (326 pages).
Furuike et al., U.S. Appl. No. 15/292,359, filed Oct. 13, 2016 (93 pages).
European Search Report dated Jan. 2, 2017 issued in corresponding European Application No. 16193339.5 (4 pgs.).
European Search Report dated Nov. 17, 2016 issued in corresponding European Application No. 16173840.6 (4 pgs.).
Extended European Search Report dated Nov. 16, 2016 issued in corresponding European Application No. 16173842.2 (8 pgs.).
Extended Search Report dated Nov. 3, 2016 in counterpart European Application No. 16173841.4 (8 pages).
Phonejoy, http://www.slashgear.com/phonejoy-play-smartphone-game-controller-hits-kickstarter-05259565/; downloaded Nov. 10, 2016, 9 pages.
Wikipad, http://www.gizorama.com/2013/news/wikipad-gaming-tablet-available-june-11; downloaded Nov. 10, 2016, 4 pages.
Caliber Advantage, https://www.engadget.com/2013/01/11/ifrogz-caliber-advantage-iphone-gaming-case-hands-on/; downloaded Nov. 10, 2016, 7 pages.
Moga Ace Power, http://www.ign.com/articles/2013/11/20/moga-ace-power-ios-game-controller-now-available; downloaded Nov. 10, 2016, 8 pages.
Logicool 6550, http://support.logitech.com/en_us/product/powershell-controller-and-battery; downloaded Nov. 10, 2016, 2 pages.
Game grip STG-ONE, http://gamegrip-stgone.com/en/index.php; downloaded Nov. 10, 2016, 7 pages.
PG-9023, http://www.ipega.hk/index.php?option=com_phocagallery&view=detail&catid=11%3Aiphone&id=1100%3Abluetooth-stretch-controller&Itemid=4&lang=en; downloaded Nov. 10, 2016, 2 pages.
L.Y.N.X 9, http://madcatz.com/gamesmart_lynx_9/; downloaded Nov. 10, 2016, 4 pages.
Gametel, https://www.engadget.com/2012/01/09/gametel-bluetooth-controller-for-android-and-ios-hands-on/; downloaded Nov. 10, 2016, 7 pages.
SMACON, http://dragonquestgame.net/use-bluetooth-controller-smacon/; downloaded Nov. 10, 2016, 9 pages.
Game Pad, http://www.geeky-gadgets.com/samsung-galaxy-s4-game-pad-21-03-2013/; downloaded Nov. 10, 2016, 5 pages.
Moga Power A, http://venturebeat.com/2013/01/14/poweras-moga-pro-gives-you-a-console-gaming-experience-wherever-you-go -hands-on-video/; downloaded Nov. 10, 2016, 5 pages.
PG-9017, http://www.infinityreviews.com/2013/04/ipega-bluetooth-controller-review.html; downloaded Nov. 10, 2016, 13 pages.
BladePad, http://www.bladepad.com/; downloaded Nov. 10, 2016, 2 pages.
Junglecat, http://www.razerzone.com/press/detail/press-releases/razer-goes-mobile-with-junglecat-ios-gaming-controller; downloaded Nov. 10, 2016, 5 pages.
Office Action dated Feb. 9, 2018 issued in U.S. Appl. No. 15/418,426 (13 pgs.).
European Search Report dated Apr. 7, 2017 issued in corresponding EP Application No. 16173964.4 (6 pgs.).
Office Action dated Sep. 27, 2017 issued in U.S. Appl. No. 15/344,276 (16 pgs.).
Fujita, Notice of Allowance dated Mar. 31, 2017, issued in US Appl. No. 15/179,011 (11 pages).
Jun. 14, 2018 Office Action issued in U.S. Appl. No. 15/344,208.
Jun. 27, 2018 Office Action issued in U.S. Appl. No. 15/292,359.

* cited by examiner

LIGHT EXITS    LIGHT BEING GUIDED    LIGHT ENTERS

ATTACHMENT

CROSS REFERENCE TO RELATED APPLICATION

The disclosure of Japanese Patent Application No. 2016-198338 filed on Oct. 6, 2016 and Japanese Patent Application No. 2016-248016 filed on Dec. 21, 2016 is incorporated herein by reference.

FIELD

The present technology relates to an attachment that can be attached to a controller.

BACKGROUND AND SUMMARY

There are conventional attachments, which are used while they are attached to controllers. When such an attachment is used while it is attached to a controller, a strap is sometimes fastened to the controller (or to the attachment).

When a strap is fastened to a controller, it is desirable that it is easy to remove the strap.

Thus, the present application discloses an attachment from which a strap can be removed easily, and a control system including the same.

(1)

An example attachment described herein is attachable to a game controller including a controller-side slide portion that includes a controller-side first operation button.

The attachment includes a strap, an attachment-side slide portion, a lock portion and an attachment-side first operation button. The attachment-side slide portion is provided on a first surface of the attachment, the attachment-side slide portion having a first side of a center of the attachment-side slide portion and a second side of the center of the attachment-slide portion opposite to each other in a predetermined slide direction, wherein the attachment-side slide portion is configured to slidably engage with the controller-side slide portion in the slide direction, and wherein the controller-side slide portion is insertable into the attachment-side slide portion from the first side. The lock portion is on the first side of the center of the attachment-side slide portion and configured to generally prevent a slide movement, in a removal direction opposite to an insertion direction, of the controller-side slide portion in a state in which the controller-side slide portion has been inserted into the attachment-side slide portion, thereby attaching the game controller to the attachment.

The attachment-side first operation button is on a second surface which is on a reverse side of the first surface. The attachment-side first operation button includes a first actuation portion. The first actuation portion is configured to move from a first position to a second position, thereby pressing the controller-side first operation button, in response to an operation of pressing the attachment-side first operation button.

With configuration (1) above, through the engagement between the slide portion of the attachment and the slide portion of the game controller, a user can easily detach the attachment (including the strap) from the game controller. That is, with the configuration above, it is possible to easily remove the strap from the game controller.

(2)

The attachment may further include a strap anchor to which the strap can be fastened, wherein the strap anchor is on a portion of the attachment which is on the same side of a center of the attachment in the slide direction as the second side.

With configuration (2) above, when a user holds the game controller (i.e., the game controller with the attachment attached thereto) with the strap put on the wrist, for example, the user can easily operate the lock portion. Then, a user can more easily remove the strap from the game controller.

(3)

The lock portion may be at an end portion on the first side of the attachment-side slide portion.

With configuration (3) above, it is possible to effectively prevent the attachment from coming off the game controller.

(4)

The lock portion may engage with an end portion of the controller-side slide portion of the game controller with the attachment attached thereto.

With configuration (4) above, it is possible to effectively prevent the attachment from coming off the game controller.

(5)

The lock portion may be configured to move between a third position and a fourth position in a direction different from the slide direction. The lock portion in the third position may protrude more than the projection in the fourth position, thereby engaging with the game controller with the attachment attached thereto.

With configuration (5) above, the lock portion can assume a state in which the lock portion is in the first position, thereby locking the game controller, and another state in which the lock portion is in the second position, thereby not locking (or not substantially locking) the game controller. Then, a user can release the lock of the game controller by moving the lock portion to the second position, and can thus easily remove the strap from the game controller.

(6)

The lock portion may be configured to move between a third position and a fourth position in a direction different from the slide direction. At the third position, the lock portion may block at least a part of an insertion port on the first side of the attachment-side slide portion. At the fourth position, the lock portion may leave open the insertion port on the first side of the attachment-side slide portion.

With configuration (6) above, as with configuration (5) above, the lock portion can assume a state in which the lock portion is in the first position, thereby locking the game controller, and another state in which the lock portion is in the second position, thereby not locking (or not substantially locking) the game controller. Then, a user can release the lock of the game controller by moving the lock portion to the second position, and can thus easily remove the strap from the game controller.

(7)

The lock portion may be configured to move in a direction that is substantially perpendicular to the slide direction.

Note that "substantially (in a certain state)" as used herein means to include cases in which that state is achieved in a strict sense and also cases in which that state is generally achieved. For example, "substantially perpendicular" means that they may be perpendicular to each other in a strict sense, and they may not be perpendicular to each other in a strict sense but may be generally perpendicular to each other.

With configuration (7) above, even when a force is applied that urges the game controller to move in the slide direction (more specifically, a direction in which the game controller is removed from the attachment), it is possible to reduce the possibility that the lock portion moves from the first position to the second position by that force. That is, even when a force is applied that urges the attachment to be detached from the game controller, it is possible to reduce the possibility that the attachment comes off the game controller.

(8)

The attachment may further include a biasing portion that biases the lock portion in a direction from the fourth position to the third position.

With configuration (8) above, with the attachment attached to the game controller, the lock portion can continue to lock the game controller (even without a user holding the lock portion, for example).

(9)

The lock portion may include a slope at an end portion on the first side that is sloped in a direction from the third position to the fourth position while extending toward the first side.

With configuration (9) above, a user can easily move the lock portion to the second position by applying a force so as to push the slope toward the second position (or toward the second side).

(10)

The lock portion may include a projection at an end portion on the first side.

With configuration (10) above, a user is allowed to hold the projection with a finger or a fingernail, thus making it easier to operate the lock portion.

(11)

The attachment may further include a bottom surface portion and an elastic member. The bottom surface portion has a bottom surface extending from the first surface in a direction away from the first surface. The elastic member is provided on the bottom surface.

With configuration (11) above, since the game controller, with the attachment attached thereto, is in contact with the elastic member, it is possible, with the elastic member, to reduce the looseness between the game controller and the attachment. This also reduces the possibility that the bottom surface of the attachment damages the game controller when the attachment is attached/detached to/from the game controller.

(12)

The elastic member may be on the bottom surface on an opposite side from the attachment-side slide portion with respect to a center of the bottom surface.

With configuration (12) above, the elastic member reduces the contact between the bottom surface and the game controller on the opposite side from the attachment-side slide portion, which is connected to the game controller. This can further reduce the possibility of the bottom surface damaging the game controller.

(13)

The game controller may include a reverse surface, a primary surface and one or more operation section. The reverse surface opposes the bottom surface when the attachment is attached to the game controller. The primary surface is a surface on an opposite side from the reverse surface. The operation section is in a predetermined area of the primary surface. The elastic member may be at a position opposing an area corresponding to the predetermined area on the reverse surface of the game controller with the attachment attached thereto.

With configuration (13) above, the elastic member can be arranged at a position corresponding to an area of the primary surface of the game controller where a force is expected to be applied by a user. It is therefore possible to effectively prevent the reverse surface of the game controller from contacting the bottom surface of the attachment.

(14)

The attachment may further include a terminal portion on the second side of the center of the attachment-side slide portion, with a surface thereof facing the first surface being exposed, wherein the terminal portion is electrically connected to a terminal of the game controller with the attachment attached thereto.

With configuration (14) above, it is possible to electrically connect together the game controller and the attachment, and to reduce the possibility that the terminal comes into contact with a hand of a user or other objects.

(15)

The attachment may include a terminal and a battery configured to supply power to the game controller via the terminal. The terminal is electrically connectable to the game controller.

With configuration (15) above, the attachment can supply power to the game controller to which the attachment is attached.

(16)

The attachment-side slide portion may be a rail member that extends along the slide direction.

With configuration (16) above, when the controller-side slide member (e.g., a slider to be described later) is inserted into the rail member of the attachment, it is easy to slide the attachment (which can be said to be the slide movement of the game controller).

(17)

The attachment-side slide portion may be metal.

With configuration (17) above, it is possible to improve the mechanical strength of the attachment-side slide portion. It is also possible to improve the mechanical strength of the attachment itself, on which the attachment-side slide portion is provided.

(18)

An area of an operation surface of the attachment-side first operation button may be larger than an area of the controller-side first operation button.

With configuration (18) above, it is possible to improve the controllability of the game controller by attaching the attachment to the game controller.

(19)

A tip of the first actuation portion may have a curved surface.

With configuration (19) above, it is possible to reduce the possibility that the button of the game controller is damaged by the first actuation portion.

(20)

The first actuation portion may have a cross-shaped cross section along a plane perpendicular to a direction from the first position to the second position.

With configuration (20) above, it is possible to reduce the volume of the actuation portion while maintaining the mechanical strength thereof.

(21)

Opposite end portions of the second surface in the slide direction may each be a rounded curved surface.

With configuration (21) above, it is possible to provide a device that is easy to hold for a user.

(22)

A light-receiving port may be provided on a bottom surface of the attachment-side slide portion. A light-exiting port may be provided on a surface of the attachment different from the bottom surface of the attachment-side slide portion.

The attachment may include a lightguide portion configured to guide light incident upon the light-receiving port to the light-exiting port.

With configuration (22) above, even when the attachment is attached to the game controller, the light from a light-emitting portion (e.g., an indicator LED to be described later) of the game controller can be presented to a user, as when the attachment is not attached to the game controller.

(23)

The light-exiting port may be provided on the second surface.

With configuration (23) above, the orientation of the light-exiting port of the attachment attached to the game controller is the same as the orientation of the light-emitting portion of the game controller, and it is therefore possible to present light from the light-exiting port in an easy-to-see manner for a user.

(24)

A controller-side second operation button may be further provided on the controller-side slide portion. The attachment may include an attachment-side second operation button on the second surface. The attachment-side second operation button may include a second actuation portion configured to move from a fifth position to a sixth position, thereby pressing the controller-side second operation button, in response to an operation of pressing the attachment-side second operation button. The light-exiting port may be provided on the second surface between the attachment-side first operation button and the attachment-side second operation button.

With configuration (24) above, even when a user operates the operation buttons, light from the light-exiting port is easy to see for the user.

(25)

Another example attachment described herein is attachable to a game controller including a controller-side slide portion.

The attachment includes an attachment-side slide portion, a lock portion and a strap anchor. The attachment-side slide portion is provided on a first surface of the attachment, the attachment-side slide portion having a first side of a center of the attachment-side slide portion and a second side of the center of the attachment-slide portion opposite to each other in a predetermined slide direction, wherein the attachment-side slide portion is configured to slidably engage with the controller-side slide portion in the slide direction, and wherein the controller-side slide portion is insertable into the attachment-side slide portion from the first side. The lock portion is on the first side of the center of the attachment-side slide portion and configured to generally prevent a slide movement, in a removal direction opposite to the insertion direction, of the controller-side slide portion in a state in which the controller-side slide portion has been inserted into the attachment-side slide portion, thereby attaching the game controller to the attachment. With the strap anchor, a strap can be attached to a portion of the attachment which is on the same side of the center of the attachment in the slide direction as the second side.

With configuration (25) above, as with configuration (1) above, the strap can be removed easily from the game controller.

(26)

The attachment may further include a housing with a hole. The strap anchor may be a shaft inside the housing. The attachment may further include a strap fastened to the shaft and extending out of the housing through the hole.

With configuration (26) above, when a user holds the game controller (i.e., the game controller with the attachment attached thereto) with the strap put on the wrist, for example, the user can easily operate the lock portion. Then, a user can more easily remove the strap from the game controller.

(27)

A controller-side first operation button may be provided on the controller-side slide portion. The attachment may include an attachment-side first operation button on a second surface which is on a reverse side of the first surface. The attachment-side first operation button may include a first actuation portion. The first actuation portion is configured to move from a first position to a second position, thereby pressing the controller-side first operation button, in response to an operation of pressing the attachment-side first operation button.

Note that in configurations (25) to (27), the attachment may further include at least one element from configurations (3) to (24).

Note that the present specification also discloses an example control system including the attachment set forth above (e.g., a control system including the attachment and a game controller to which the attachment can be attached).

With the attachment and the control system described above, it is easy to remove the strap from the game controller.

These and other objects, features, aspects and advantages will become more apparent from the following detailed description when taken in conjunction with the accompanying drawings.

DETAILED DESCRIPTION OF NON-LIMITING EXAMPLE EMBODIMENTS

[1. Outline]

Figure 1:
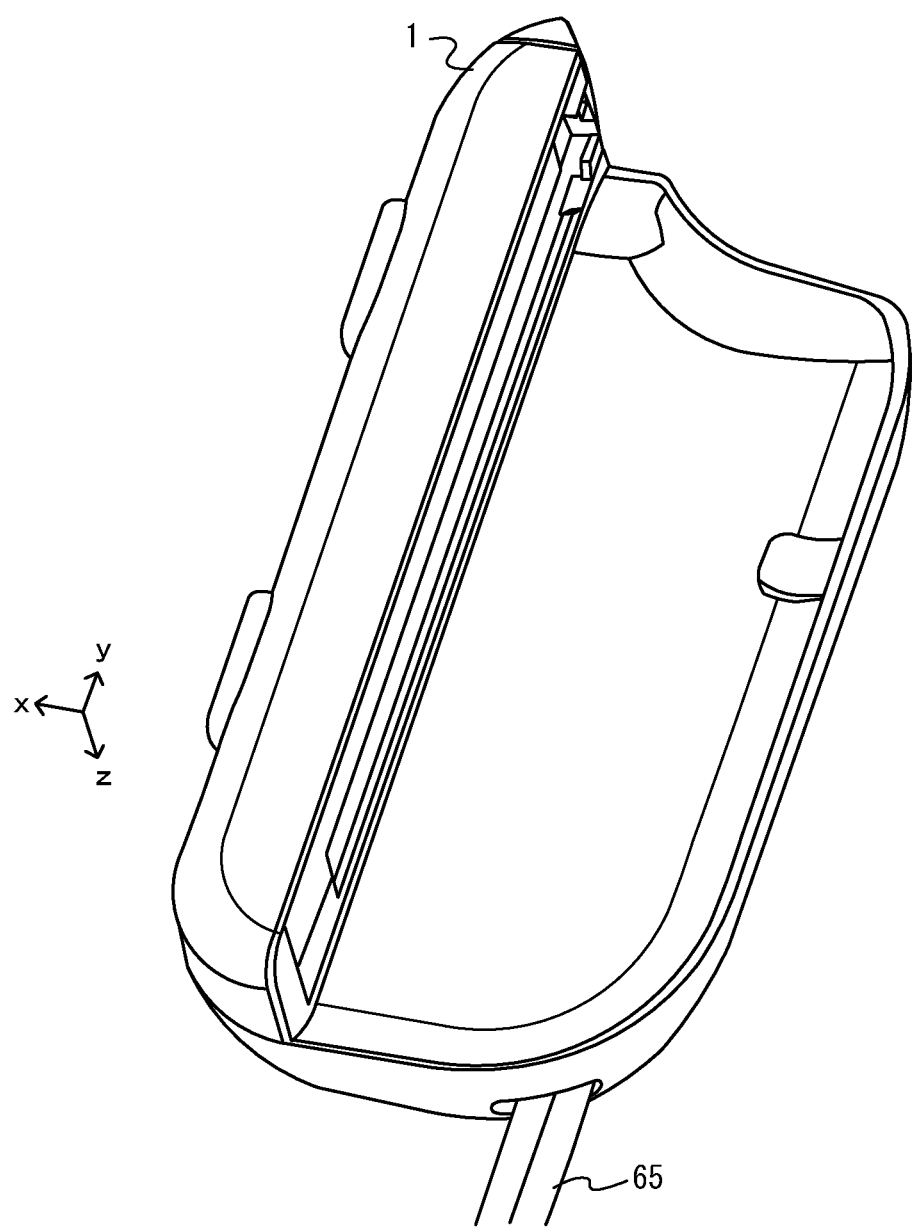
FIG. 1 is a perspective view showing the appearance of an example strap attachment according to the present embodiment.

An attachment according to an example of the present embodiment, and a control system including the same will now be described. FIG. 1 is a perspective view showing the appearance of the strap attachment according to.

A strap attachment 1 shown in FIG. 1 is an example attachment that can be attached to a controller attachment, and is an attachment having a strap 65. Note that FIG. 1 only shows a part of the strap 65. A user can fasten the strap 65 to the game controller by attaching the strap attachment 1 to a game controller to be described later. Since the strap attachment 1 can be easily attached/detached to/from a game controller by means of a slide mechanism, the details of which will be described later, the removal of the strap from the game controller can be made easier by the present embodiment. The strap attachment of the present embodiment and a control system including the strap attachment will now be outlined.

(1-1: Game Device with which Strap Attachment can be Used)

Figure 2:
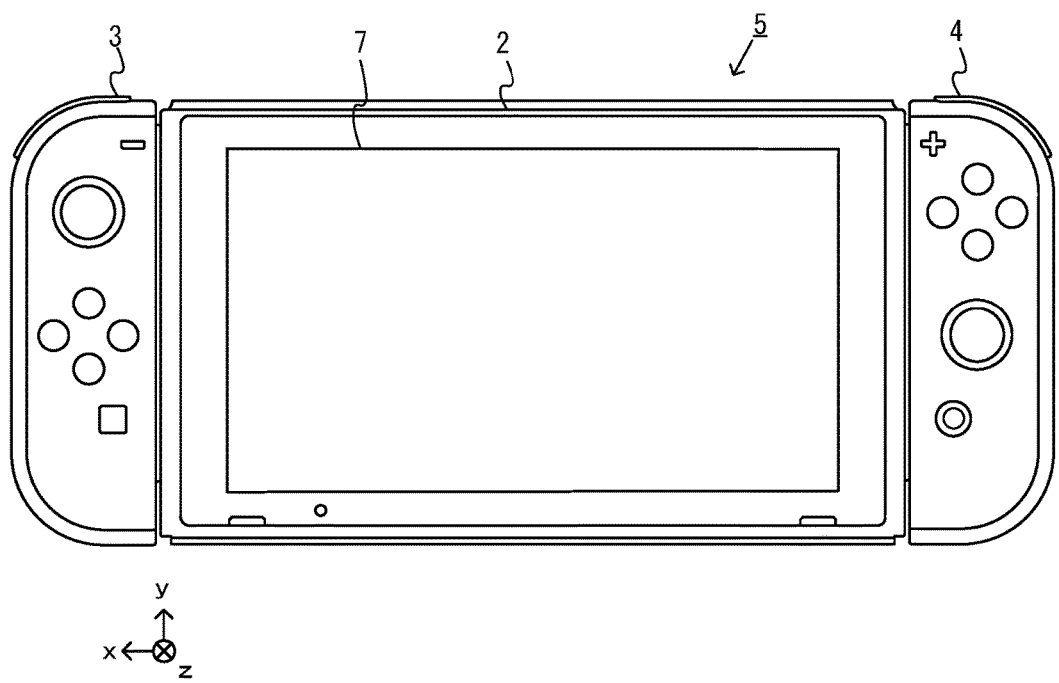
FIG. 2 shows an example game device, with which a strap attachment is used.
Figure 3:
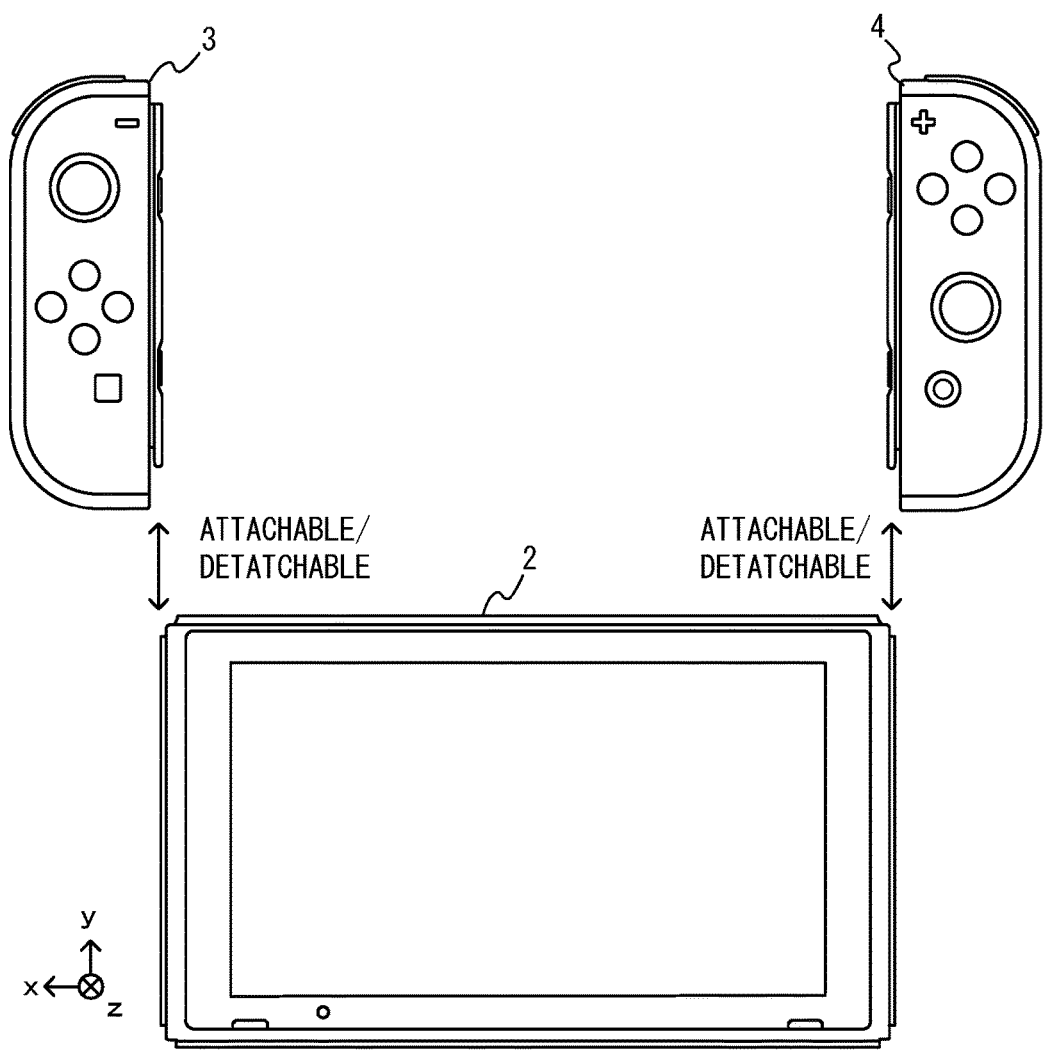
FIG. 3 shows an example state in which controllers are removed from a main unit.

First, referring to FIG. 2 and FIG. 3, an example game device with which the strap attachment 1 can be used (i.e., a game device to which the strap attachment 1 can be attached) will be described. FIG. 2 and FIG. 3 each show an example game device with which the strap attachment 1 can be used. As shown in FIG. 2, a game device 5 includes a main unit 2, a left controller 3 and a right controller 4. The main unit 2, including a display 7, executes various processes of the game device 5. The left controller 3 and the right controller 4 are each an example controller, to which the strap attachment 1 can be attached, and are each an input device (referred to also as a "controller device") allowing a user to make an input. Note that the left controller 3 and the right controller 4 may hereinafter be referred to collectively as a "controller".

FIG. 3 shows an example state in which the controllers 3 and 4 are removed from the main unit 2. As shown in FIG. 2 and FIG. 3, the controllers 3 and 4 can be attached/detached to/from the main unit 2. The left controller 3 can be attached to the left side of the main unit 2 (the x-axis positive direction side shown in FIG. 2). The right controller 4 can be attached to the right side of the main unit 2 (the x-axis negative direction side shown in FIG. 2). In the present embodiment, the strap attachment 1 can be attached to the controller 3 or 4 that has been removed from the main unit 2.

Note that in the present embodiment, the main unit 2 and the controllers 3 and 4 each include a slide portion, and the controllers 3 and 4 are attached (or "connected") to the main unit 2 by means of a slide mechanism, which is formed by these slide portions. The controllers 3 and 4 each include a slider as a slide portion. The main unit 2 includes, as a slide portion, a rail member capable of slidably engaging with the slider. Note that the slider of the controllers 3 and 4 will be described later. Although the rail member of the main unit 2 will not be described in detail, the rail member of the main unit 2 is similar to a rail member of the strap attachment 1 (the details of this rail member will be described later) in that it is capable of slidably engaging with the slider.

When attaching a controller to the main unit 2, a user first inserts the slider of the controller into the rail member of the main unit 2, thereby engaging the slider and the rail member with each other. Then, a user can slide the slider all the way into the rail member, thereby attaching the controller to the main unit 2.

In the present embodiment, as shown in FIG. 3, the controller is attached to the main unit 2 from the upper side (i.e., from the y-axis positive direction side). That is, the controller is attached to the main unit 2 by inserting the slider (specifically, the lower end of the slider) into the upper end portion of the rail member. In other words, it can be said that the main unit 2 is attached to the controller from the lower side. This allows a user to attach/detach the controller to/from the main unit 2 while the main unit 2 is placed on the floor, thereby facilitating the attachment/detachment.

As described above, with the game device 5 of the present embodiment, a user can hold and use the entirety of the game device 5 by attaching the controllers 3 and 4 to the main unit 2 or can hold and use only a controller by removing the controller 3 or 4 from the main unit 2. The strap attachment of the present embodiment is used while it is attached to a controller having been removed from the main unit 2.

(1-2: Outline of Attachment to Controller)

Figure 4:
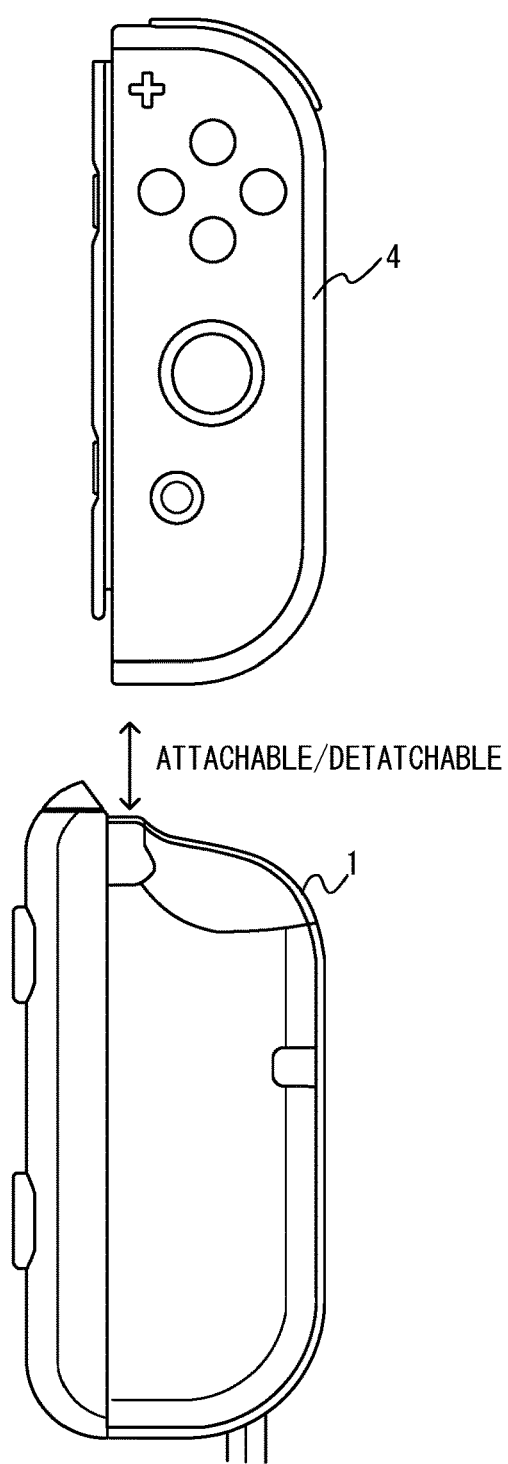
FIG. 4 shows an example of how a strap attachment is attached to a right controller.
Figure 5:
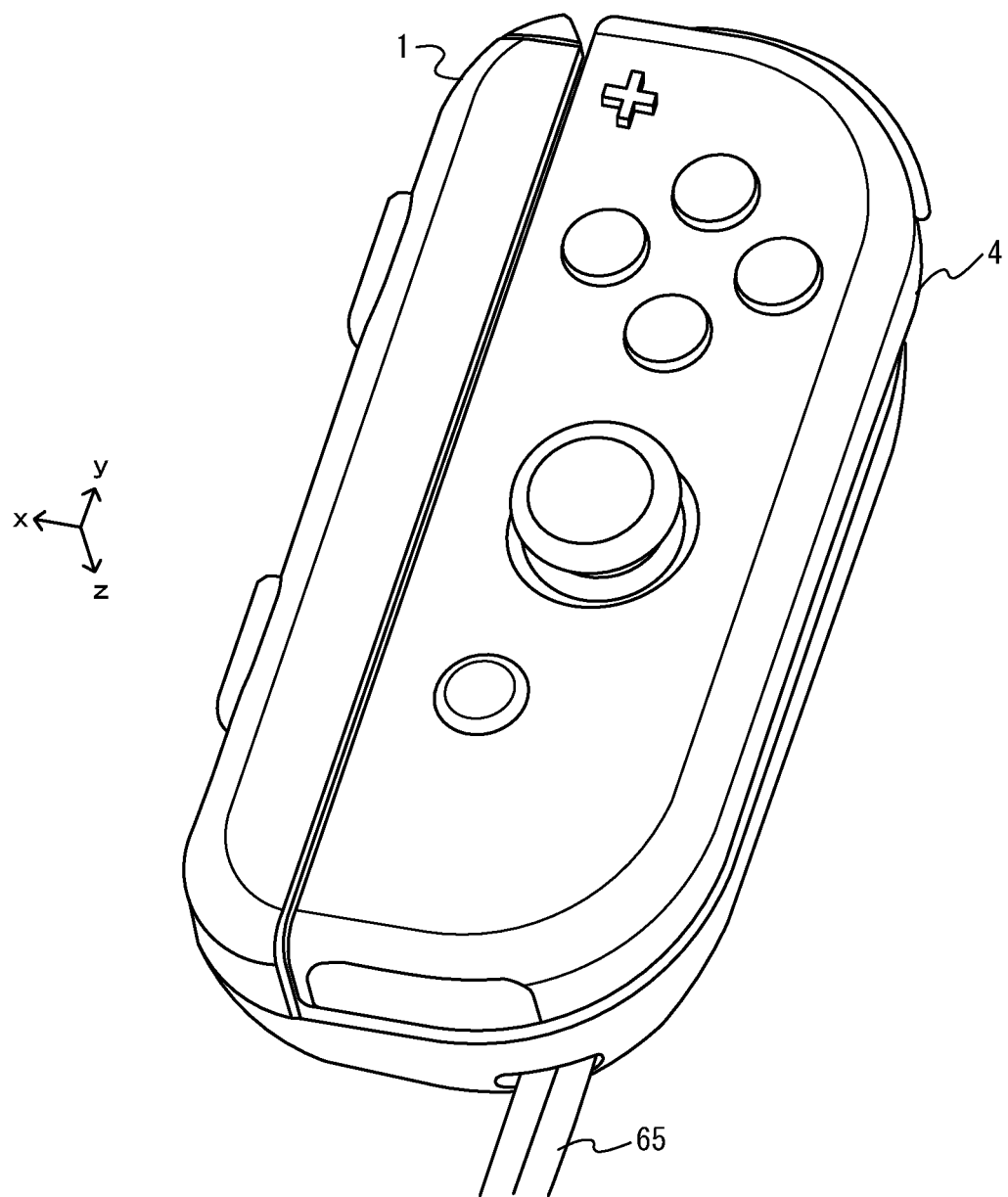
FIG. 5 shows an example state in which a strap attachment is attached to a right controller.

Next, referring to FIG. 4 and FIG. 5, how the strap attachment 1 is attached to the controller will be outlined. FIG. 4 shows an example of how the strap attachment is attached to the right controller. In the present embodiment, the strap attachment 1 includes a rail member (the details of the rail member will be described later) capable of slidably engaging with the slider of the right controller 4. Therefore, the strap attachment 1 can be attached to the right controller 4 by inserting the slider of the right controller 4 into the rail member of the strap attachment 1 in a similar manner to that when attaching the right controller 4 to the main unit 2 (see FIG. 4).

FIG. 5 shows an example state in which the strap attachment is attached to the right controller. As shown in FIG. 5, with the strap attachment 1 attached to the right controller 4, the right controller 4 and the strap attachment 1 have an integral appearance (i.e., they appear as if they were an integral unit). Therefore, a user can hold and use the right controller 4 and the strap attachment 1 as an integral unit. Then, a user may hold the right controller 4 and the strap attachment 1 with the strap 65 of the strap attachment 1 put on the wrist. Then, in a situation in which a user swings the right controller 4 and the strap attachment 1, for example, it is possible to control the distance between the user's hand and the right controller 4 and the strap attachment 1 within a predetermined range.

As described above, the strap attachment 1 of the present embodiment is attachable to the right controller 4. Note however that in other embodiments, the strap attachment may be attachable to the left controller 3. Note that in the present embodiment, the left controller 3 has a slide member similar to that of the right controller, the details of which will be described later. Since the rail member of the strap attachment 1 to be described later is symmetric with respect to the central axis extending parallel to the slide direction (more specifically, symmetric with respect to the opposite sides in the z-axis direction shown in FIG. 9), it is possible, by using the rail member of the strap attachment 1, to realize a strap attachment that is attachable to the left controller 3. As will be described later (see "[4. Functions/effects and variations of present embodiment]"), the strap attachment may be attachable to both the left controller 3 and the right controller 4.

[2. Configuration of Controller]

Figure 6:
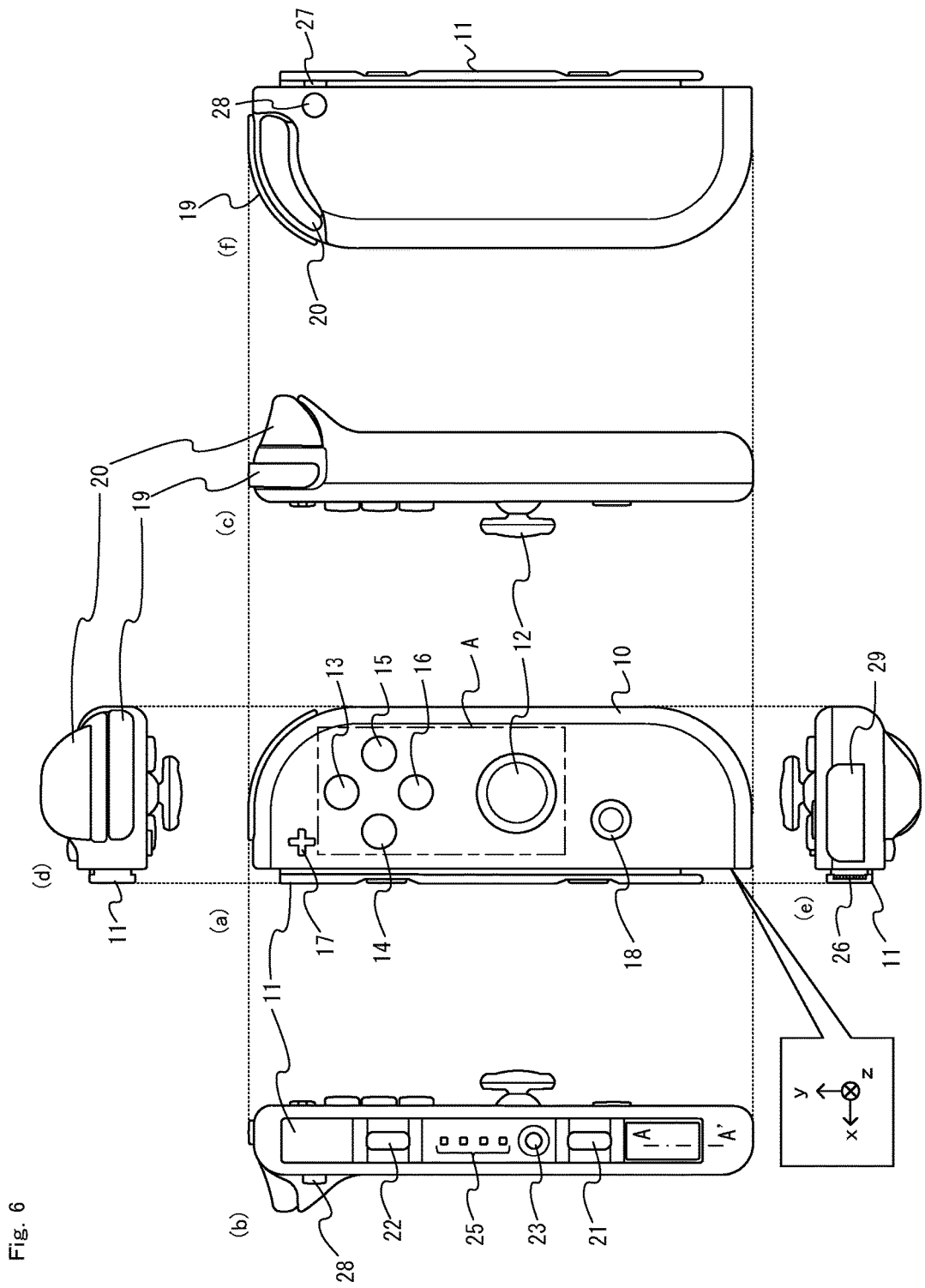
FIG. 6 is a six-sided view showing an example right controller.

Next, referring to FIG. 6, an example configuration of the right controller 4 will be described. FIG. 6 is a six-sided view showing an example right controller. Note that the xyz coordinate system of FIG. 6 represents directions in the front view ((a) of FIG. 6).

(2-1: Housing)

As shown in FIG. 6, the right controller 4 includes a housing 10. In the present embodiment, the housing 10 has an oblong shape (elongated in the up-down direction in FIG. 6). The housing 10 generally has a rectangular parallelepiped shape with six sides. As shown in FIG. 6, the right corner portion of the primary surface of the housing 10 (in other words, the front side surface, i.e., the z-axis negative direction side surface shown in FIG. 6) has a more rounded shape than the left corner portion. That is, the connecting portion between the upper side surface and the right side surface of the housing 10 and the connecting portion between the lower side surface and the right side surface of the housing 10 are more rounded (in other words, round-cornered with a greater radius) than the connecting portion between the upper side surface and the left side surface and the connecting portion between the lower side surface and the left side surface. Therefore, when the right controller 4 is connected to the main unit 2 or the strap attachment 1 (see FIG. 2 and FIG. 5), the corner portions of the device including the right controller 4 will be rounded, making it easier for a user to hold the device.

(2-2: Slider)

As shown in FIG. 6, the right controller 4 includes a slider 11. As described above, the slider 11 is a slide portion for connecting the right controller 4 to the main unit 2 or the strap attachment 1. The slider 11 is provided so as to protrude from the left side surface (i.e., the side surface on the x-axis positive direction side) of the right controller 4.

Figure 7:
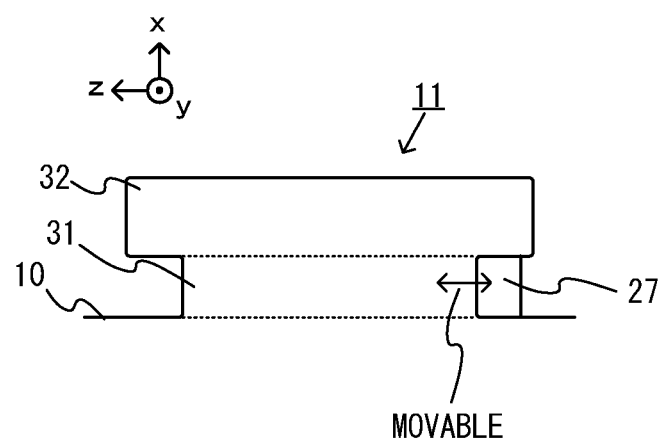
FIG. 7 is an enlarged view showing a slider of an example right controller.

FIG. 7 is an enlarged view showing the slider of the right controller. FIG. 7 is an enlarged view showing the slider 11 shown in FIG. 6 as seen from above (i.e., from the y-axis positive direction side). As shown in FIG. 7, the slider 11 is generally shaped so that a cross section thereof taken along a plane perpendicular to the slide direction (i.e., the y-axis direction) is T-shaped.

Specifically, the slider 11 includes a shaft 31 and a top surface portion 32. The shaft 31 is provided so as to protrude from the housing 10. The top surface portion 32 is provided on the side opposite from the housing 10 (i.e., the x-axis positive direction side) of the shaft 31. The width of the top surface portion 32 (i.e., the length with respect to the z-axis direction) is greater than the width of the shaft 31. The end of the top surface portion 32 in the z-axis direction is located so as to protrude past (in other words, located on the outer side of) the end of the shaft 31 in the z-axis direction.

Thus, the cross section of the slider 11 taken along a plane perpendicular to the slide direction has a shape such that the width of the first portion (i.e., the shaft 31) protruding from the side surface of the housing 10 is less than the width of the second portion (i.e., the top surface portion 32) farther away from the side surface of the housing 10 than the first portion. With such a shape, the slider 11 in engagement with the rail member is secured so as not to come off the rail member in the direction perpendicular to the slide direction (see FIG. 13), the details of which will be described later.

As shown in FIG. 6 and FIG. 7, in the present embodiment, the right controller 4 includes a projection 27. As shown in FIG. 7, the projection 27 is provided so as to protrude from the side surface of the shaft 31 of the slider 11. Specifically, a hole is provided on the side surface of the shaft 31, and the projection 27 is provided so as to protrude through the hole. The projection 27 can move between the protruding state in which the projection 27 is protruding from the side surface of the shaft 31 and a state in which the projection 27 has moved from the position in the protruding state toward the inside of the side surface (referred to as the "retracted state"; note however that the projection 27 does not need to be retracted completely inside the shaft 31). In the present embodiment, the projection 27 is biased toward the protruding state by means of an elastic member (referred to also as a "biasing member") such as a spring, for example.

In a state in which the right controller 4 is attached to the main unit 2 (referred to as the "attached state"), the projection 27 is used for locking the slide movement of the right controller 4 with respect to the main unit 2. The rail member of the main unit 2 includes a cut-out portion at a position corresponding to the projection 27 in the attached state. Although not shown in the figure, the cut-out portion of the rail member of the main unit 2 is formed at a position similar to that of a cut-out portion provided in the rail member of the strap attachment 1 (the details of which will be described later) (see FIG. 10). Note that in the present embodiment, the projection 27 is provided along the upper half of the slider 11 (i.e., on the y-axis positive direction side), and the cut-out portion is provided along the upper half of the rail member. Thus, in the attached state, the projection 27 in the protruding state is caught on the cut-out portion of the rail member. Thus, the projection 27 is capable of generally preventing (in other words, locking) the slide movement of the right controller 4 against the main unit 2.

As shown in FIG. 6, the right controller 4 includes a release button 28. Although not shown in the figure, a release button 28 is configured so that the release button 28 can move in conjunction with the projection 27. Specifically, the projection 27 is in the protruding state when the release button 28 is not pressed, and the projection 27 is brought into the retracted state in response to the release button 28 being pressed. In the attached state, when the projection 27 is in the retracted state, the projection 27 is not caught (or is not substantially caught) on the cut-out portion of the rail member. Therefore, in the retracted state, the engagement (in other words, the lock) by the projection 27 is released.

Thus, a user can press the release button 28 to bring the projection 27 into the retracted state, releasing the lock by the projection 27. Therefore, a user can easily remove the right controller 4 from the main unit 2 by sliding the right controller 4 while the release button 28 is pressed to release the lock.

(2-3: Input Section)

The right controller 4 includes operation sections (or "input sections") allowing a user to perform input operations. In the present embodiment, the right controller 4 includes an analog stick 12 and buttons 13 to 23 as operation sections.

The analog stick 12 and the buttons 13 to 18 are provided on the primary surface of the housing 10. The analog stick 12 is an example of a direction input section, with which it is possible to make directional inputs. When the right controller 4 is used detached from the main unit 2, the operation sections provided on the primary surface of the housing 10 are operated by the thumbs of a user holding the right controller 4.

A first R button 19 and a ZR button 20 are provided on the upper side surface (i.e., the side surface on the y-axis positive direction side) of the housing 10. The first R button 19 is provided over a corner portion between the right side surface and the upper side surface of the housing 10. The ZR button 20 is provided to extend over a corner portion between the right side surface and the upper side surface of the housing 10 (strictly speaking, between the right side surface and the upper side surface as seen from the front side of the housing 10) while extending into the reverse surface of the housing 10. When the right controller 4 is used detached from the main unit 2, and when a user holds the right controller 4 in one hand, for example, the buttons 19 and 20 provided on the upper side surface of the housing 10 are operated using the index finger and/or the middle finger of the user, for example.

As shown in FIG. 6, the ZR button 20 of the right controller 4 is provided so as to project from the housing 10. That is, a portion of the reverse surface of the housing 10 where the ZR button 20 is provided (more specifically, at least a portion of the area around the ZR button 20) projects past other portions of the housing 10. The ZR button 20 is provided so as to project past the other portions of the housing 10 on the reverse surface. Therefore, when the right controller 4 is attached to the main unit 2 and when the main unit 2 is placed on a flat surface in such an orientation that the reverse surface of the right controller 4 opposes the horizontal flat surface, the projecting portions of the housing 10 are in contact with the flat surface. As a result, the main unit 2 is placed so that the upper side of the main unit 2 is slightly raised from the lower side thereof, and it is easy for a user to see the display 7.

A second L button 21 and a second R button 22 are provided on the top surface of the slider 11. Herein, the top surface of the slider is a surface that is facing substantially the same direction as the surface of the housing 10 on which the slider is provided. In other words, the top surface is a surface that opposes the bottom surface of the rail member of the main unit 2 when the controller is attached to the main unit 2. When a user holds the right controller 4 using both hands, for example, the buttons 21 and 22 provided on the top surface of the slider 11 are operated using the index finger and/or the middle finger of the user, for example.

The buttons 13 to 22 are used to give instructions in accordance with various programs executed on the main unit 2 (e.g., the OS program and application programs).

A pairing button 23 is provided on the top surface of the slider 11. In the present embodiment, the pairing button 23 is used to give instructions regarding wireless communication between the right controller 4 and the main unit 2. Processes regarding wireless communication include, for example, a setting (referred to also as pairing) process regarding wireless communication between the right controller 4 and the main unit 2, and a process (also referred to as a resetting process) of disconnecting and then reconnecting wireless communication.

Note that in the present embodiment, the buttons 21 to 23 provided on the top surface of the slider 11 are provided so as not to protrude past the top surface. That is, the operation surfaces of the buttons 21 to 23 are arranged flush with the top surface of the slider 11 or arranged at a position sunken from the top surface. This allows the slider 11 to slide smoothly against the rail member when the slider 11 is engaged with the rail member of the main unit 2 or the strap attachment 1.

Although not shown in the figures, the right controller 4 includes an acceleration sensor and an angular velocity sensor as example input sections in the present embodiment. The acceleration sensor detects the magnitude of the linear acceleration along directions of predetermined three axes (e.g., the xyz axes shown in FIG. 6). Note that the acceleration sensor may detect acceleration in one axis direction or two axis directions. The angular velocity sensor detects the angular velocity about predetermined three axes (e.g., the xyz axes shown in FIG. 6). Note that the angular velocity sensor may detect the angular velocity about one axis or two axes.

Based on the detection results of the acceleration sensor and the angular velocity sensor, the main unit 2 can calculate information regarding the movement and/or the attitude of the right controller 4. That is, in the present embodiment, a user is allowed to perform an operation of moving the controller itself. Note that in other embodiments, another type of sensor may be used as a sensor (e.g., an inertial sensor) for calculating the movement, the attitude and/or the position of the controller.

(2-4: Other Elements)

The right controller 4 includes an indicator LED 25. The indicator LED 25 is an indicator section for indicating predetermined information to the user. In the present embodiment, the right controller 4 includes four LEDs as the indicator LED 25. For example, the predetermined information may be the number assigned to the right controller 4 by the main unit 2 or may be information regarding the remaining battery level of the right controller 4.

As shown in FIG. 6, in the present embodiment, the indicator LED 25 is provided on the slider 11 (specifically, on the top surface of the slider 11). Thus, the indicator LED 25 is arranged at such a position that the indicator LED 25 cannot be seen with the right controller 4 attached to the main unit 2, and the indicator LED 25 is used primarily when the right controller 4 is detached from the main unit 2. In the present embodiment, the indicator LED 25 is provided between the second L button 21 and the second R button 22. Then, when a user holds the right controller 4 using both hands, for example, the indicator LED 25 is arranged at such a position that it is easy to see the indicator LED 25 (in other words, such a position that it is unlikely blocked by the hands of the user) for the user who operates the second L button 21 using the index finger of the left hand and the second R button 22 using the index finger of the right hand.

The right controller 4 includes a terminal 26 via which the right controller 4 is electrically connected to the main unit 2 (or the strap attachment 1). In the present embodiment, the terminal 26 is provided in a lower end portion (i.e., an end portion on the y-axis negative direction side) of the slider 11. The present embodiment is configured so that the terminal 26 of the right controller 4 and the terminal of the main unit 2 (or the terminal of the strap attachment 1) are in contact with each other in the attached state, though this will not be discussed in detail. This enables wired communication via the terminal between the right controller 4 and the main unit 2 in the attached state.

Note that in the present embodiment, the right controller 4 has a function of communicating with the main unit 2 in wireless communication. While there is no particular limitation on the communication scheme between the main unit 2 and the controllers, the main unit 2 and the controllers 3 and 4 can communicate with each other in accordance with the Bluetooth (registered trademark) standard in the present embodiment.

Thus, in the present embodiment, the controller is capable of communicating with the main unit 2 either attached to the main unit 2 or removed from the main unit 2. For example, the controller transmits, to the main unit 2, data representing inputs on the input sections.

Figure 8:
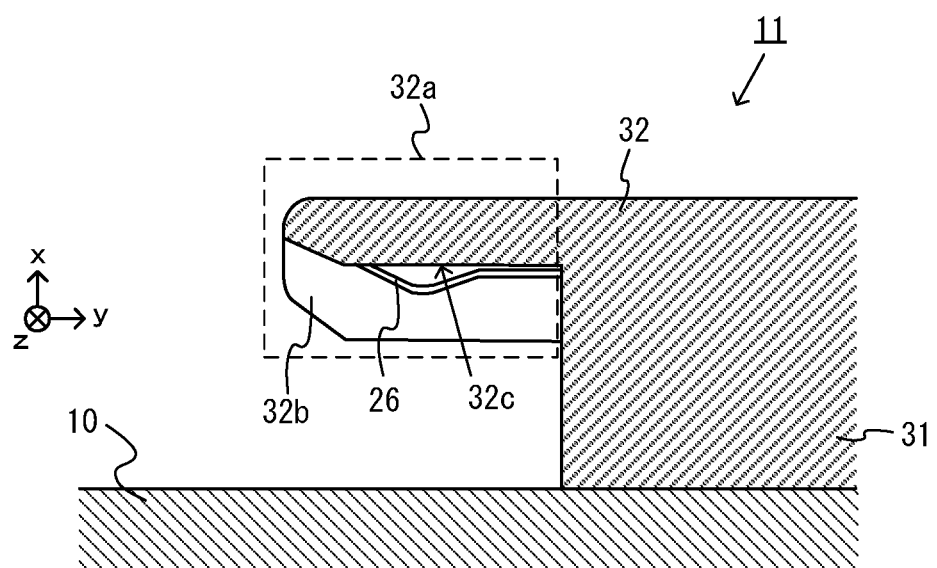
FIG. 8 schematically shows an example cross section near a lower end portion of a slider.

FIG. 8 schematically shows an example cross section near a lower end portion of a slider. FIG. 8 schematically shows an example partial cross section of the slider 11 taken along line A-A' shown in FIG. 6. Note that "to schematically show" as used herein means to show an element of interest (e.g., the slider in FIG. 8) in such a manner that its size, shape and positional relationship with other elements may be different from other figures for the purpose of showing the element in an easy-to-understand manner.

As shown in FIG. 6 and FIG. 8, the slider 11 includes the protruding portion 32a on the lower end side portion of the slider 11. The protruding portion 32a is provided on the lower end side portion of the slider 11 so as to project in the slide direction (more specifically, in the lower direction, i.e., the y-axis negative direction). The protruding portion 32a is provided on a portion of the slider 11 that is away from the housing 10 (i.e., the x-axis positive direction side). That is, the protruding portion 32a is provided with a gap between the protruding portion 32a and the housing 10. The protruding portion 32a has an opposing surface 32c that is facing the housing 10 of the right controller 4. The opposing surface 32c opposes a predetermined surface (specifically, the left side surface) of the right controller 4.

As shown in FIG. 8, the terminal 26 is provided on the opposing surface 32c of the protruding portion 32a. Therefore, the terminal 26 is arranged so that one side thereof facing the housing 10 is exposed. Thus, the terminal 26 is arranged on the reverse side of the slider 11 (specifically, the protruding portion 32a). As the terminal 26 is arranged so that one side thereof facing the housing 10 is exposed, as described above, it is possible to reduce the possibility that the terminal 26 comes into contact with a hand of a user or other objects, thereby protecting the terminal 26. Note that as shown in FIG. 8, the distal end of the terminal 26 is located on the inner side of the distal end of the protruding portion 32a (specifically, the distal end in the y-axis negative direction) of the in the slide direction. This also protects the terminal 26.

Note that as shown in FIG. 8, the protruding portion 32a includes a wall portion 32b. The wall portion 32b is provided on each side of the opposing surface 32c with respect to a direction that is parallel to the opposing surface 32c and substantially perpendicular to the slide direction (i.e., the z-axis direction). With the wall portion 32b, it is possible to further reduce the possibility that the terminal 26 comes into contact with a hand of a user or other objects, and thus to protect the terminal 26 more reliably.

When the left controller 3 is attached to the strap attachment 1, a stopper portion 54 (FIG. 13) of the strap attachment 1 to be described later is inserted into the space between the terminal 26 (in other words, the protruding portion 32a) and the left side surface of the housing 10, the details of which will be described later. Note that as shown in FIG. 8, a slope is provided at the distal end of the protruding portion 32a in the slide direction, wherein the slope is sloping from the opposing surface 32c on which the terminal 26 is provided toward the surface on the reverse side from the opposing surface 32c (in other words, in the direction away from the left side surface of the housing 10). Therefore, when the left controller 3 is attached to the strap attachment 1, the stopper portion 54 of the strap attachment 1 can be more easily inserted into the space between the protruding portion 32a and the left side surface of the housing 10.

As shown in FIG. 6, a window portion 29 is provided in the lower side surface of the housing 10. In the present embodiment, the right controller 4 includes an infrared image-capturing section (not shown) to detect the hand movement and/or the gesture of the user by means of the infrared image-capturing section. The window portion 29 is provided so as to allow the camera of the infrared image-capturing section arranged inside the housing 10 to capture an image of around the right controller 4. The window portion 29 is provided for protecting the lens of the camera of the infrared image-capturing section, and is made of a material (e.g., a transparent material) that allows light of a wavelength to be detected by the camera to pass therethrough.

Although not shown in the figures, the right controller 4 includes a battery and a power control circuit. The power control circuit is connected to the battery and is connected to various sections of the right controller 4 (specifically, electronic components such as electronic circuits that are driven by the power from the battery). The power control circuit controls the power supply from the battery to the various sections. The battery is connected to the terminal 26. In the present embodiment, when the strap attachment 1 is attached to the right controller 4, the battery is charged by power supply from the strap attachment 1 via the terminal 26, the details of which will be described later.

(2-5: Configuration of Left Controller 3)

The left controller 3 is configured differently from the right controller 4 with respect to the shape of the housing (the housing of the left controller 3 has a shape that is generally in left-right symmetry with the housing 10 of the right controller 4) and the arrangement of the operation sections (the analog stick and the buttons) (see FIG. 2 and FIG. 3).

On the other hand, the left controller 3 has a similar configuration to that of the right controller 4 with respect to the slide portion (specifically, the slider). Note that the right controller 4 includes the slider provided on the left side surface of the housing 10, whereas the left controller 3 includes the slider provided on the right side surface of the housing (see FIG. 3). Note however that in the present embodiment, the right controller 4 is the same as the left controller 3 with respect to the slider and the members to be provided on the slider (specifically, the buttons 21 to 24 and the indicator LED 25).

The left controller 3 includes an acceleration sensor and an angular velocity sensor, as does the right controller 4, and a user is allowed to perform an operation of moving the left controller 3 itself.

In the present embodiment, the second L button and the second R button are provided on the top surface of the slider of the controllers 3 and 4. The second L button and the second R button are arranged at the same position on the left controller 3 and on the right controller 4 with respect to the up-down direction (i.e., the y-axis direction).

In the present embodiment, indicator LEDs (four indicator LEDs in the present embodiment) are provided on the top surface of the slider of each of the controllers 3 and 4. The indicator LEDs are arranged at the same position on the left controller 3 and on the right controller 4 with respect to the up-down direction (i.e., the y-axis direction).

Note that for the controllers 3 and 4, there is no particular limitation on the shape, the number and the arrangement of the various elements (specifically, the slider, the stick, the buttons, the LEDs, etc.) provided on the housing. For example, in other embodiments, the controllers 3 and 4 may include a direction input section of a different type from an analog stick. The slider may be arranged at a position that corresponds to the position of the rail member provided on the main unit 2, and may be, for example, arranged on the primary surface or the reverse surface of the housing. In other embodiments, one or more of the various elements described above may be absent on the controllers 3 and 4.

[3. Configuration of Strap Attachment]

Figure 9:
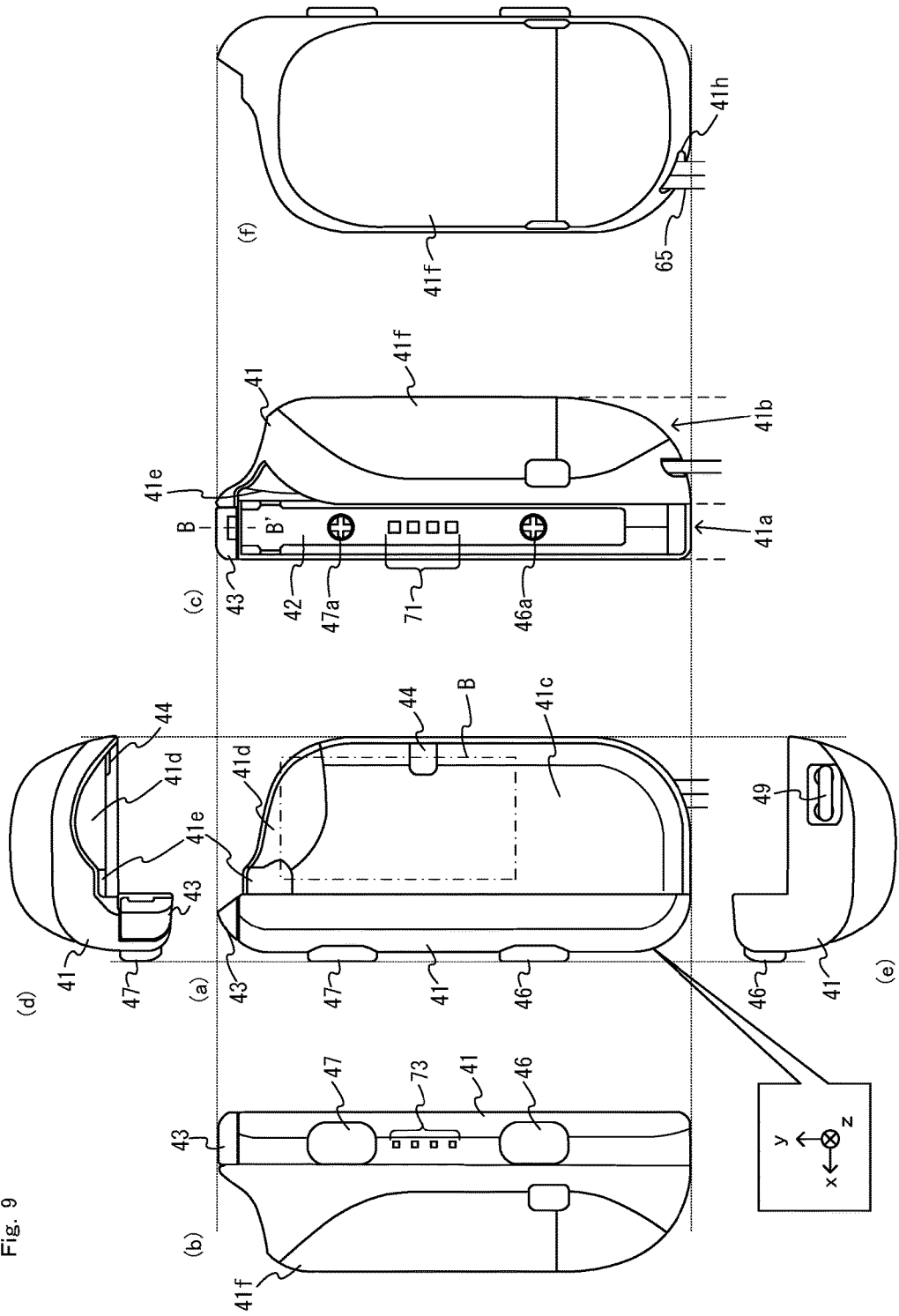
FIG. 9 is a six-sided view showing an example strap attachment.

Next, referring to FIG. 9 to FIG. 21, an example configuration of the strap attachment 1 will be described. FIG. 9 is a six-sided view showing an example strap attachment. Note that the xyz coordinate system of FIG. 9 represents directions in the front view ((a) of FIG. 9).

(3-1: Elements Regarding Housing)

As shown in FIG. 9, the strap attachment 1 includes a housing 41. Although there is no particular limitation on the shape of the housing 41, the housing 41 in the present embodiment includes an attachment portion 41*a* on the front side (i.e., the z-axis negative direction side) and a holding portion 41*b* on the rear side (see FIG. 9(*c*)). The attachment portion 41*a* and the holding portion 41*b* may be an integral part or two separate parts connected together.

The attachment portion 41*a* is a portion to which the right controller 4 is attached. As shown in FIG. 9, the attachment portion 41*a* has an oblong shape (elongated in the up-down direction in FIG. 9). The attachment portion 41*a* has an engaging surface (in other words, the right side surface, i.e., the surface on the x-axis negative direction side) and a button provision surface (in other words, the left side surface, i.e., the surface on the x-axis positive direction side). The rail member 42 used for the attachment of the right controller 4 is provided on the engaging surface. Buttons 46 and 47 are provided on the button provision surface. Note that since the rail member 42 is provided on the engaging surface, the housing can be said to include the rail member 42. That is, the rail member 42 can be said to be a part of the housing.

As shown in FIG. 9, in the present embodiment, the opposite end portions of the button provision surface of the attachment portion 41*a* in the slide direction (i.e., the y-axis direction) are each a rounded curved surface. Then, the device including the strap attachment 1 and the right controller 4 to which the strap attachment 1 is attached (hereinafter referred to as the "strap-attached controller device") can have rounded corner portions (see FIG. 5). Thus, it is possible to provide a device that is easy to hold for a user.

On the other hand, the holding portion 41*b* is a portion to be held by a user, in a state in which the right controller 4 is attached to the strap attachment 1 (referred to as the "attached state"). That is, when a user holds a strap-attached controller device with one hand or with both hands, and when buttons provided on the primary surface of the controller (i.e., the surface on the z-axis negative direction side) are operated using the thumb, the strap-attached controller device is held by supporting the holding portion using some of the index to little fingers.

As shown in FIG. 9, the holding portion 41*b* has a bottom surface 41*c*. The bottom surface 41*c* extends from the rear-side edge of the engaging surface of the attachment portion 41*a* away from the engaging surface. The bottom surface 41*c* is substantially perpendicular to the engaging surface. In the attached state, the bottom surface 41*c* opposes the reverse surface (i.e., the surface on the z-axis positive direction side) of the housing 10 of the right controller 4 (see FIG. 6). In the present embodiment, the bottom surface 41*c* is arranged so as not to be in contact with the reverse surface of the housing 10 of the right controller 4 (note however that an elastic member 44 to be described later is in contact with the reverse surface) in the attached state. Thus, it is possible to reduce the possibility of the bottom surface 41*c* of the strap attachment 1 damaging the right controller 4 when attaching/detaching the strap attachment 1 to/from the right controller 4. Note that in other embodiments, the bottom surface 41*c* is in contact with the reverse surface of the housing 10 of the right controller 4 in the attached state.

As shown in FIG. 9, the strap attachment 1 includes the elastic member 44 provided on the bottom surface 41*c*. The elastic member 44 is provided at such a position that the elastic member 44 is in contact with the right controller 4 in the attached state. The elastic member 44 is provided so as to protrude (slightly) past the bottom surface 41*c* (see FIG. 9(*d*)). Therefore, since the right controller 4 is in contact with the elastic member 44 in the attached state, it is possible, with the elastic member 44, to reduce the looseness between the right controller 4 and the strap attachment 1, enabling a firmer connection between the right controller 4 and the strap attachment 1. This also further reduces the possibility that the bottom surface 41*c* of the strap attachment 1 damages the right controller 4 when the strap attachment 1 is attached/detached to/from the right controller 4. Moreover, when the right controller 4 is vibrated by a vibrator (not shown), it is possible to effectively transmit the vibration of the right controller 4 to the strap attachment 1 via the elastic member 44. It is also possible to reduce the noise (in other words, "chattering") produced by the vibration.

As shown in FIG. 9, the elastic member 44 is provided on the bottom surface 41*c* on the opposite side from the rail member 42 (i.e., the x-axis negative direction side) with respect to the center of the bottom surface 41*c*. More specifically, the elastic member 44 is provided at an end portion of the area of the bottom surface 41*c* (strictly speaking, an area of the bottom surface 41*c* that opposes the reverse surface of the right controller 4 in the attached state) that is on the opposite side from the rail member 42. Thus, with the elastic member 44 reducing the contact between the bottom surface 41*c* and the right controller 4 on the opposite side from the rail member 42, which is connected to the right controller 4, the entire bottom surface 41*c* is unlikely to be in contact with the right controller 4. This can further reduce the possibility of the bottom surface 41*c* damaging the right controller 4.

For the up-down direction (i.e., the y-axis direction), the elastic member 44 is located so as to correspond to the operation sections (specifically, the analog stick 12 and the buttons 13 to 16) provided on the primary surface of the right controller 4 in the attached state. Note that the analog stick 12 and the buttons 13 to 16 are those operation sections that are expected to be operated frequently during the use of the strap-attached controller device. Specifically, the operation sections are provided within a predetermined area (i.e., the area A delimited by a one-dot chain line in FIG. 6) of the primary surface of the right controller 4. On the reverse surface of the right controller 4 in the attached state, the elastic member 44 is provided at a position opposing an area (i.e., an area on the reverse surface) that corresponds to the predetermined area (see FIG. 9). Note that the area B delimited by a one-dot chain line in FIG. 9 represents an area on the bottom surface 41c that opposes the area on the reverse surface of the right controller 4 corresponding to the predetermined area. Thus, for the up-down direction, the elastic member 44 is provided at a position that overlaps the area B.

Since the operation sections are expected to be operated frequently, it is believed that a force is likely acting in the front-to-rear direction (i.e., the z-axis positive direction) on the predetermined area A of the housing 10 of the right controller 4. Therefore, without the elastic member 44 provided on the bottom surface 41c, the predetermined area A of the housing 10 would likely contact the bottom surface 41c in some cases. On the contrary, in the present embodiment, the elastic member 44 is arranged in the area B corresponding to the predetermined area A, and it is therefore possible to effectively prevent the reverse surface of the right controller 4 from contacting the bottom surface 41c of the strap attachment 1.

As shown in FIG. 9, the holding portion 41b has a projection-receiving surface 41d. The projection-receiving surface 41d is a surface that opposes the projection of the housing 10 of the right controller 4 (i.e., the projecting portion provided around the ZR button 20) in the attached state. Specifically, the projection-receiving surface 41d extends upward and diagonally rearward from the upper edge of the bottom surface 41c. In other words, the bottom surface 41c is formed as a cut-out portion at the upper end. The upper edge of the bottom surface 41c is located slightly downward of the projection of the right controller 4 in the attached state.

With such a configuration, the projection-receiving surface 41d opposes the projection of the right controller 4 in the attached state. Note that in the present embodiment, the projection-receiving surface 41d is provided so as not to contact the projection in the attached state in order to reduce the possibility of the projection-receiving surface 41d damaging the right controller 4. Note however that in other embodiments, the projection-receiving surface 41d may contact the projection in the attached state. In the attached state, the bottom surface 41c can avoid the projection of the right controller 4 by virtue of the cut-out of the projection-receiving surface 41d. Thus, the projection-receiving surface 41d enables the attachment between the strap attachment 1 and the right controller 4 having a projection on the reverse surface thereof. A user can operate the ZR button 20 of the right controller 4 even in the attached state.

As shown in FIG. 9, the holding portion 41b has a release button contact surface 41e. The release button contact surface 41e is a surface that contacts (in other words, presses) the release button 28 of the right controller 4 in the attached state. Specifically, the release button contact surface 41e is provided at a position that opposes the release button 28 of the right controller 4 in the attached state. The release button contact surface 41e is provided on the rear side (i.e., the z-axis positive direction side) of the bottom surface 41c. Specifically, the distance between the bottom surface 41c and the release button contact surface 41e in the front-rear direction is shorter than the length of the release button 28 in the front-rear direction in the protruding state (in other words, the length over which the release button 28 protrudes from the housing 10). Note that in other embodiments, the release button contact surface 41e may be provided at the same position as the bottom surface 41c in the front-rear direction or may be provided on the front side of the bottom surface 41c.

With such a configuration, in the attached state, the release button contact surface 41e contacts the release button 28 of the right controller 4, slightly pressing the release button 28. Then, in the state in which the strap attachment 1 is attached to the right controller 4, as opposed to in the state in which the right controller 4 is attached to the main unit 2, the projection 27 does not enter the protruding state and does not engage (or does not substantially engage) with the rail member. Therefore, when the strap attachment 1 is attached to the right controller 4, a user does not need to press the release button 28 in order to remove the strap attachment 1 from the right controller 4. Note that when the strap attachment 1 is attached to the right controller 4, a lock portion 43 of the strap attachment 1, instead of the projection 27, generally prevents (in other words, locks) the slide movement of the right controller 4 against the strap attachment 1, the details of which will be described later.

In the present embodiment, the holding portion 41b can accommodate a battery. That is, as shown in FIG. 9, the holding portion 41b has a battery lid 41f. The battery lid 41f can be attached/detached to/from the main part of the holding portion 41b (i.e., the part excluding the battery lid 410. In the present embodiment, inside the holding portion 41b, a battery is placed on the inner side of the battery lid 41f. The battery may be a primary battery or may be a secondary battery. A user can replace the battery by removing the battery lid 41f The battery is for supplying power to the right controller 4 to which the strap attachment 1 is attached. The strap attachment 1 supplies the power of the battery to the right controller 4 to which the strap attachment 1 is attached, the details of which will be described later.

(3-2: Elements Regarding Rail Member)

As shown in FIG. 9, the strap attachment 1 includes the rail member 42. The rail member 42 is an example slide portion capable of slidably engaging with the slider 11 of the right controller 4. The rail member 42 is provided on the engaging surface of the housing 41. Note that in other embodiments, the rail member 42 may be provided as an integral part of the housing 41. That is, a part of the housing 41 may serve as the rail member.

Figure 10:
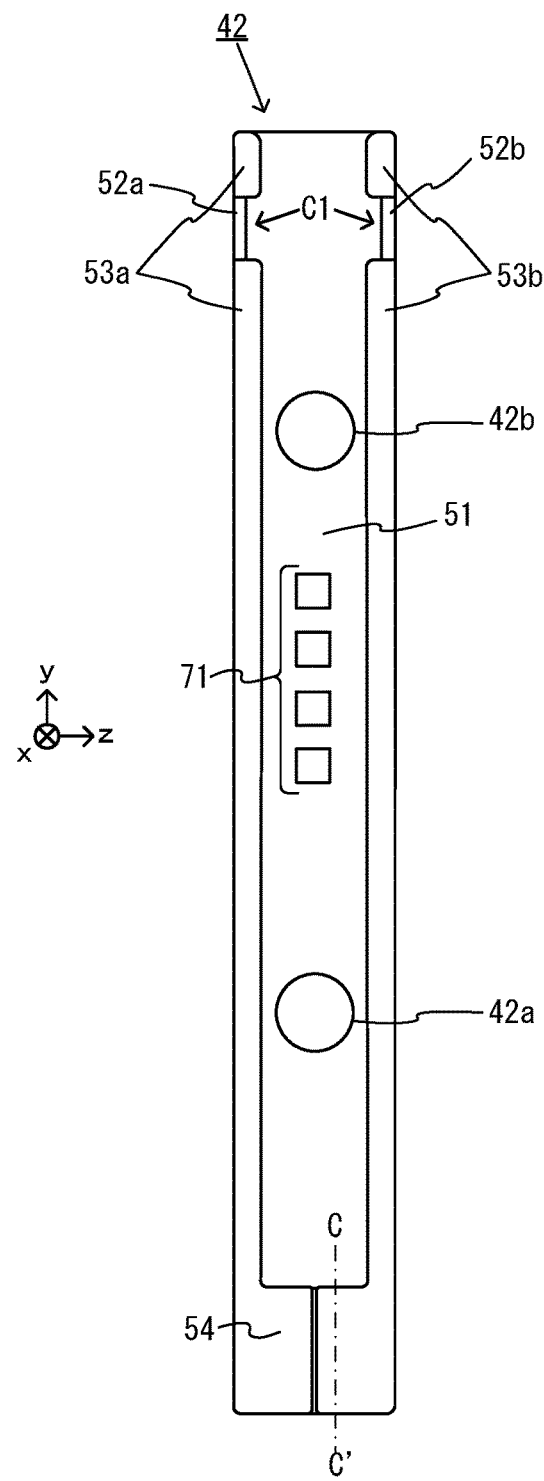
FIG. 10 is an enlarged view showing an example rail member shown in FIG. 9.
Figure 11:
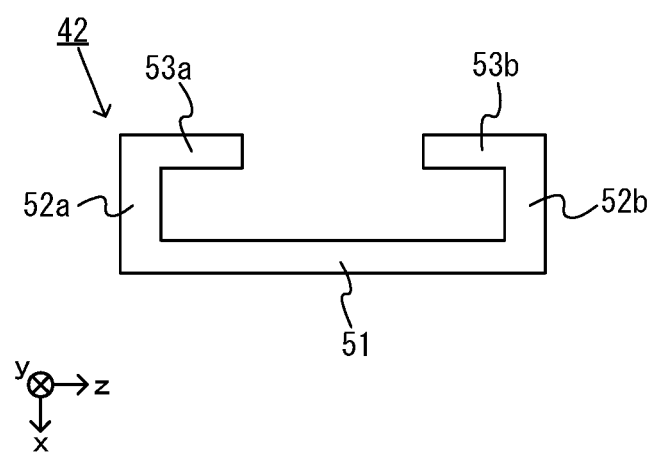
FIG. 11 schematically shows an example rail member as seen from the slide direction.

FIG. 10 is an enlarged view of the rail member shown in FIG. 9. FIG. 11 schematically shows an example rail member as seen from the slide direction. As shown in FIG. 10 and FIG. 11, the rail member 42 includes a bottom surface portion 51, side surface portions 52a and 52b and opposing portions 53a and 53b. Note that the side surface portions 52a and 52b may hereinafter be referred to collectively as "side surface portion 52". The opposing portions 53a and 53b may be referred to collectively as "opposing portion 53". In the present embodiment, the portions 51 to 53 are generally plate-shaped members.

The bottom surface portion 51 is placed on the engaging surface of the housing 41 so as to be substantially parallel to the engaging surface. The bottom surface portion 51 includes a bottom surface of the rail member 42. As shown in FIG. 11, the side surface portion 52 includes side surfaces substantially perpendicular to the bottom surface. The side surface portion 52 extends, substantially perpendicular to the bottom surface portion 51, from opposite ends of the bottom surface portion 51 with respect to the width direction (i.e., the z-axis direction). Specifically, the side surface portion 52a extends from one end (i.e., on the z-axis negative direction side) of the bottom surface portion 51, and the side surface portion 52b extends from the other end (i.e., on the z-axis positive direction side) of the bottom surface portion 51. As shown in FIG. 11, the bottom surface portion 51 and the side surface portion 52 together form a groove.

As shown in FIG. 11, the opposing portion 53 is provided to extend from each of the two side surfaces of the side surface portion 52, and includes a surface that opposes the bottom surface. The opposing portion 53 extends in a direction substantially parallel to the bottom surface from an end (i.e., an end on the x-axis negative direction side) of the side surface portion 52 that is opposite to the end at which the bottom surface portion 51 is connected to the side surface portion 52. Specifically, the opposing portion 53a extends from an end portion of the side surface portion 52a on the x-axis negative direction side, and the opposing portion 53b extends from an end portion of the side surface portion 52b on the x-axis negative direction side. The opposing portions 63a and 63b are provided so as to protrude from the side surface portion 52 toward the inside of the rail member 42 (in other words, so as to protrude toward each other). The opposing portion 53a and the opposing portion 53b are spaced apart from each other so that the slider of the controller can be inserted into the groove formed by the bottom surface portion 51 and the side surface portion 52 (FIG. 11).

Figure 12:
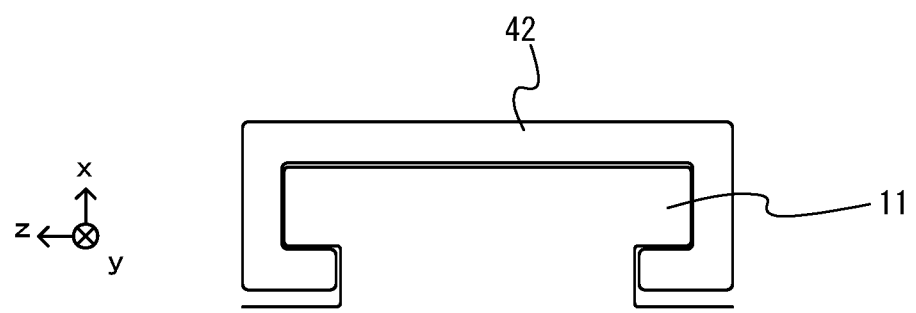
FIG. 12 schematically shows an example state in which a slider of a right controller is in engagement with a rail member of a strap attachment.

FIG. 12 schematically shows an example state in which the slider of the right controller is in engagement with the rail member of the strap attachment. When the strap attachment 1 is attached to the right controller 4, the slider 11 of the right controller 4 is inserted into the groove of the rail member 42, thereby achieving a state in which the rail member 42 and the slider 11 are engaged with each other as shown in FIG. 12. In this state, the slider 11 in engagement with the rail member 42 is allowed to slide in the slide direction (i.e., the y-axis direction) while being secured by the opposing portion 53 so as not to come off in the direction (i.e., the x-axis direction) perpendicular to the slide direction.

Note that as shown in FIG. 10, a part of the upper end portion (i.e., an end portion on the y-axis positive direction side) of the opposing portion 53 includes a cut-out portion C1. The cut-out portion C1 is provided at a position that corresponds to the projection 27 of the right controller 4 with the strap attachment 1 attached to the right controller 4. Note that as described above, in the attached state, the release button 28 of the right controller 4 is pressed by the release button contact surface 41e, and therefore, the projection 27 does not (substantially) engage with the opposing portion 53.

As shown in FIG. 10, the rail member 42 includes the stopper portion 54. The stopper portion 54 stops the slide movement, in the insertion direction (i.e., the y-axis negative direction), of the slider 11 of the right controller 4 inserted in the rail member 42. Specifically, as shown in FIG. 10, the upper end (i.e., the end on the y-axis positive direction side) of the rail member 42 is open so that the slider 11 of the right controller 4 can be inserted therethrough. On the other hand, the stopper portion 54 is provided at the lower end portion of the rail member 42. Therefore, the stopper portion 54 comes into contact with the slider 11 being inserted from the upper side in the slide direction, thereby stopping the slide movement of the slider 11.

More specifically, in the present embodiment, as shown in FIG. 10, the stopper portion 54 includes a first portion arranged on one side of an axis (i.e., the y axis) extending along the slide direction and a second portion arranged on the other side thereof. In the present embodiment, the first portion and the second portion are spaced apart from each other. The gap between the first portion and the second portion is so small that the slider 11 cannot be inserted therethrough. Therefore, when the slider 11 is inserted into the rail member 42, the slide movement of the slider 11 is stopped with a portion of the slider 11 near the distal end thereof being in contact with the stopper portion 54. Note that in other embodiments, there may be no gap between the first portion and the second portion. That is, the first portion and the second portion may be formed as an integral unit.

Note that in other embodiments, the slide movement of the slider 11 may be stopped by the distal end of the slider 11 (specifically, the distal end of the protruding portion 32a) being in contact with a wall surface provided on the far end of the stopper portion 54 instead of (or in addition to) the stopper portion 54 being in contact with the slider 11.

Note that in the present embodiment, the "state in which the strap attachment 1 is attached to the right controller 4 (i.e., the attached state)" is the state in which the slide movement of the slider 11 is substantially limited by the stopper portion 54. Note that in addition to the state in which the slider 11 is in contact with the stopper portion 54, the attached state also includes a state in which the slider 11 and the stopper portion 54 are not in contact with each other in a strict sense but the slider 11 cannot substantially move in the insertion direction (because there is substantially no gap between the slider 11 and the stopper portion 54).

Figure 13:
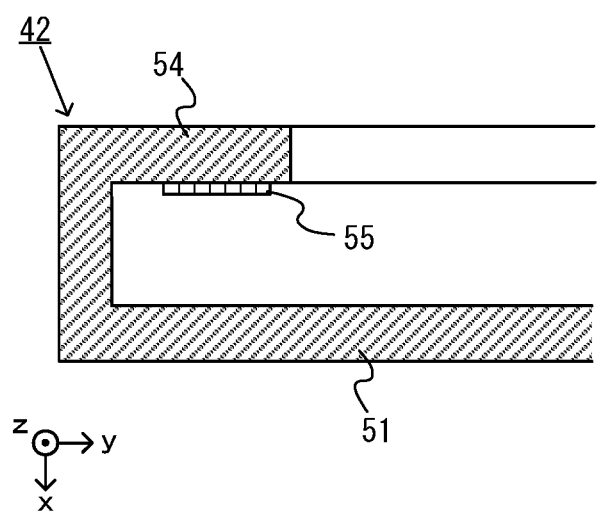
FIG. 13 schematically shows an example cross section near a lower end portion of a rail member.

FIG. 13 schematically shows an example cross section near a lower end portion of a rail member. FIG. 13 schematically shows an example partial cross section of the rail member 42 taken along line C-C' shown in FIG. 10.

As shown in FIG. 13, the stopper portion 54 is provided, with a gap between the stopper portion 54 and the bottom surface portion 51, at a position opposing a part of the bottom surface portion 51 (specifically, near the lower end of the bottom surface portion 51). The stopper portion 54 has an opposing surface opposing the bottom surface portion 51. The opposing surface is a surface that faces toward the housing 41 of the strap attachment 1 (in other words, the engaging surface). In the present embodiment, when the strap attachment 1 is attached to the right controller 4, the slider 11 (more specifically, the protruding portion 32a) of the right controller 4 is inserted into the space between the bottom surface portion 51 and the stopper portion 54.

As shown in FIG. 13, the strap attachment 1 includes a terminal 55. The terminal 55 is provided on the opposing surface of the stopper portion 54. As shown in FIG. 13, the terminal 55 is arranged with a side thereof facing the bottom surface portion 51 being exposed. Thus, in the present embodiment, the terminal 55 is arranged on a member (i.e., the stopper portion 54) that is arranged with a gap between the member and the engaging surface (in other words, the bottom surface portion 51) of the strap attachment 1, and on the reverse side (i.e., the side opposing the bottom surface portion 51) of the member. Then, it is possible to reduce the possibility that the terminal 55 comes into contact with a hand of a user or other objects, thus protecting the terminal 55.

In the present embodiment, in the attached state, the protruding portion 32a of the slider 11 of the right controller 4 is inserted into the gap between the bottom surface portion 51 and the stopper portion 54 of the rail member 42 of the strap attachment 1. In the attached state, the terminal 26 provided on the protruding portion 32a and the terminal 55 provided on the stopper portion 54 are in contact with each other. Therefore, in the attached state, the strap attachment 1 and the right controller 4 are electrically connected to each other.

In the present embodiment, in the attached state, the strap attachment 1 supplies the power of the battery described above to the right controller 4. Specifically, the strap attachment 1 includes a power supply control section for supplying the power of the battery to the right controller 4 via the terminal 55. The battery of the right controller 4 is charged with the power supplied from the strap attachment 1 via the terminal 26. Note that in the attached state, the strap attachment 1 may supply power to the right controller 4 under a predetermined condition. For example, the strap attachment 1 may supply power to the right controller 4 when the remaining battery level of the right controller 4 is less than or equal to a predetermined level, or may supply power to the right controller 4 in response to an instruction from the right controller 4.

As described above, in the present embodiment, a user can attach the strap attachment 1 to the right controller 4 to charge the right controller 4. Therefore, when the battery of the right controller 4 is exhausted, for example, a user can attach the strap attachment 1 to the right controller 4, allowing the user to continue to use the right controller 4.

Note that in other embodiments, communication may be made via a terminal between the strap attachment 1 and the right controller 4 in the attached state. For example, information regarding the remaining battery level may be exchanged between the strap attachment 1 and the right controller 4 via the terminal.

As described above, in the present embodiment, the strap attachment 1 includes, as the slide portion, the rail member 42 that extends along the slide direction. Then, when the slider 11 of the controller is inserted into the rail member 42 of the strap attachment 1, it is easy to slide the strap attachment 1 (which can be said to be the slide movement of the right controller 4).

Note that in other embodiments, the slide portion of the strap attachment 1 does not need to be a single member extending in the slide direction, but may include a plurality of members arranged along the slide direction. For example, the strap attachment 1 may include, instead of the rail member 42, a plurality of members having a similar cross-sectional shape (specifically, a cross-sectional shape taken along a plane perpendicular to the slide direction) to that of the rail member 42. In this case, the plurality of members are arranged along the slide direction. Also with such a plurality of members, the strap attachment 1 can slidably engage with the slider 11 of the right controller 4.

In the present embodiment, the rail member 42 is formed from metal. Then, it is possible to improve the mechanical strength of the rail member. It is also possible to improve the mechanical strength of the housing 41 itself, on which the rail member is provided. Note that in the present embodiment, the housing 41 is formed from a resin. In other embodiments, there is no particular limitation on the material of the rail member 42, and the rail member 42 may be formed from a resin (which may be a resin harder than that of the housing 41).

In other embodiments, the strap attachment 1 may include an elastic member provided on the rail member 42. For example, the elastic member is provided on the bottom surface of the rail member 42 so as to protrude past the bottom surface. The elastic member may be of any elastic material, e.g., a rubber, or may be a leaf spring of a metal or a resin. The elastic member is in contact with the slider 11 of the right controller 4 in the attached state. That is, in the attached state, the elastic member applies a force upon the slider 11 in the direction away from the bottom surface of the rail member 42. Therefore, with the elastic member, it is possible to reduce the looseness between the right controller 4 and the strap attachment 1, enabling a firmer connection between the right controller 4 and the strap attachment 1. When the right controller 4 is vibrated by a vibrator (not shown), it is possible to reduce the noise produced by the vibration.

(3-3: Elements Regarding Lock Portion)

As shown in FIG. 9, the strap attachment 1 includes a lock portion 43. The lock portion 43 generally prevents the slide movement in the removal direction opposite to the insertion direction in the attached state in which the strap attachment 1 is attached to the right controller 4, the details of which will be described later. With the lock portion 43, it is possible to reduce the possibility of the strap attachment 1 coming off the right controller 4.

Figure 14:
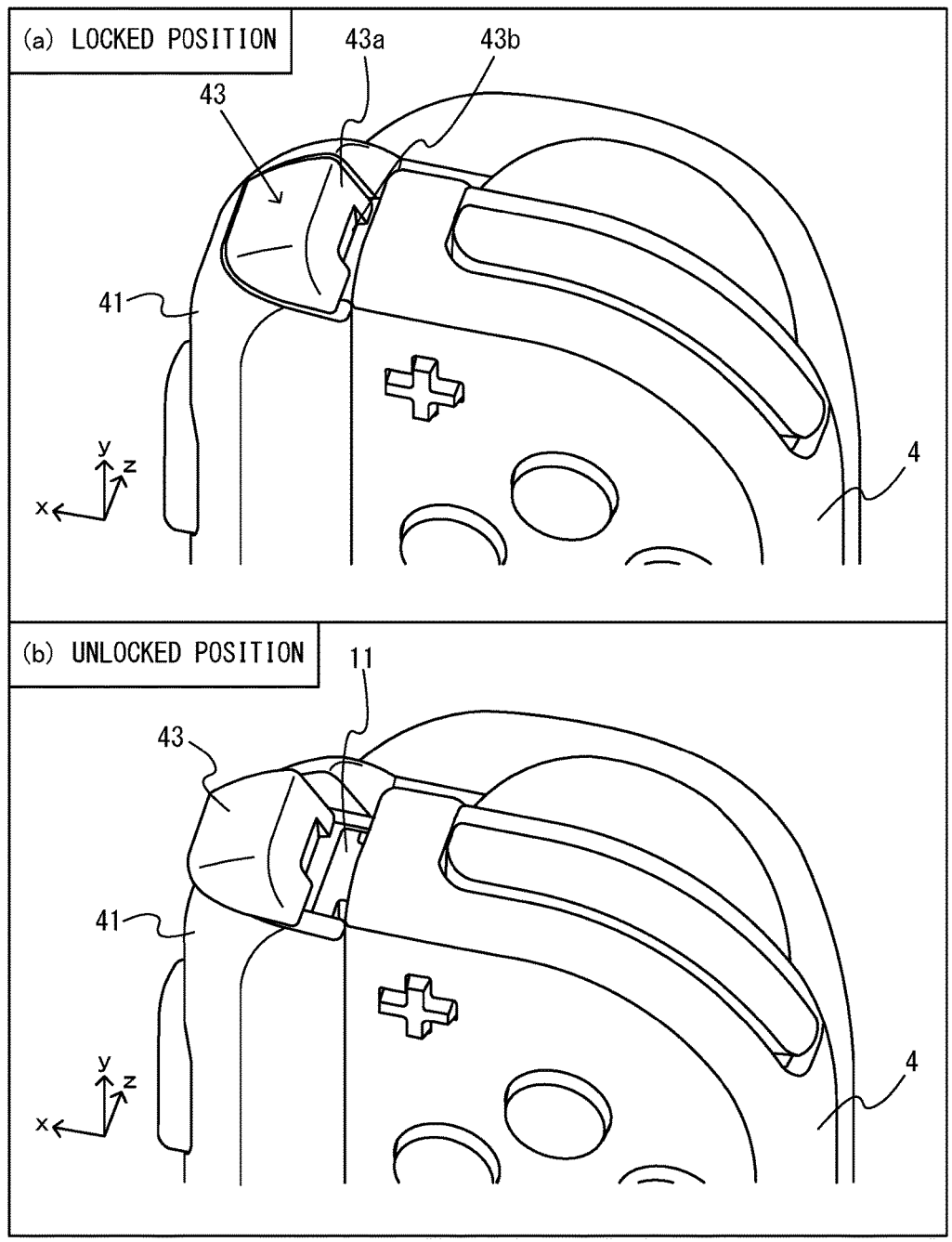
FIG. 14 shows an example of how a lock portion moves.
Figure 15:
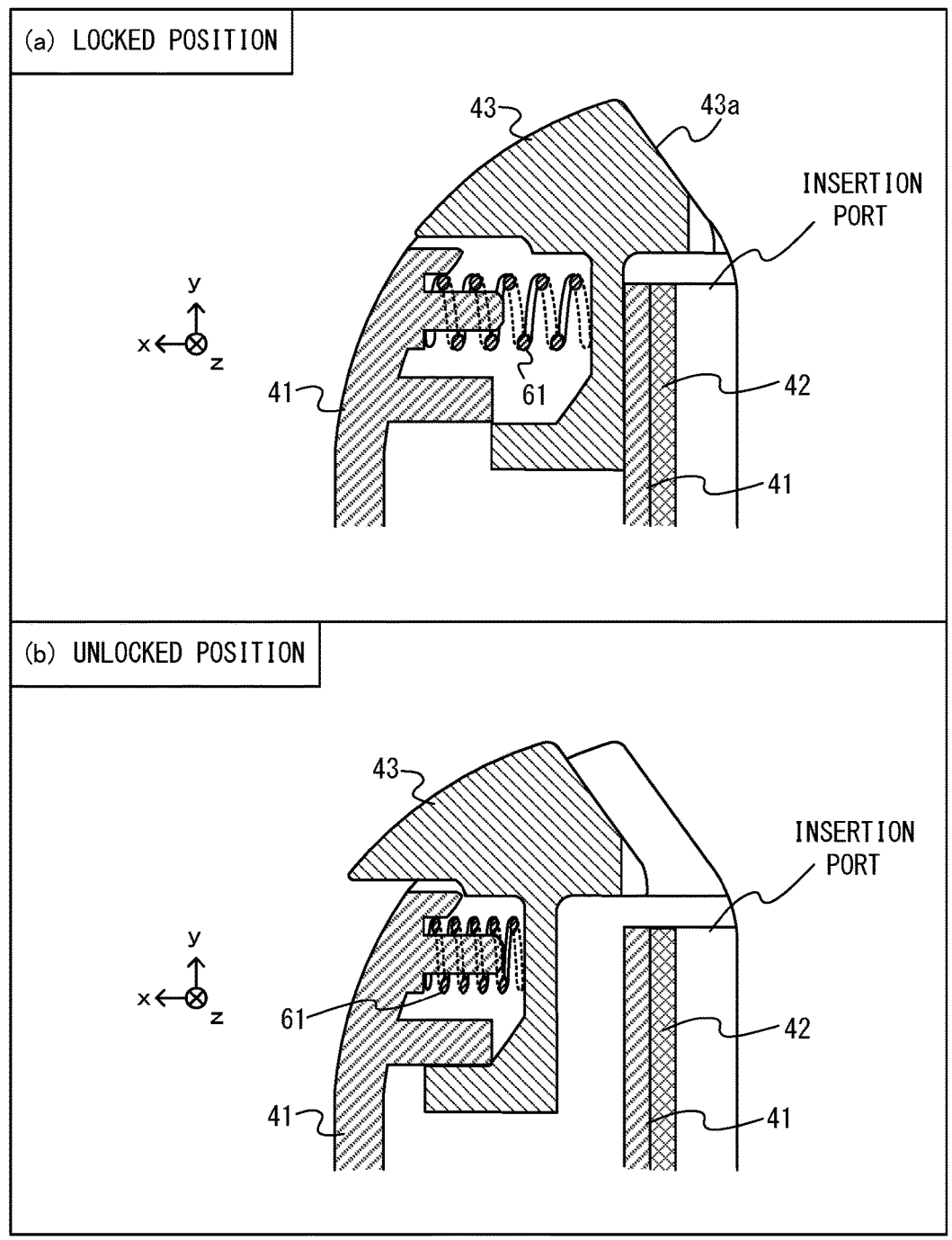
FIG. 15 shows an example of how a lock portion moves.

FIG. 14 and FIG. 15 show an example of how a lock portion moves. FIG. 14 is a perspective view showing a lock portion as seen from above, and FIG. 15 schematically shows an example partial cross section of the strap attachment 1 taken along line B-B' shown in FIG. 9. Note that in order to facilitate understanding of elements of interest to be discussed, FIG. 15 does not show some elements, e.g., the holding portion 41b, of the housing 41 that are not relevant to the discussion.

As shown in FIG. 9, the lock portion 43 is provided at an upper end portion (i.e., the y-axis positive direction side) of the rail member 42. More specifically, the lock portion 43 is provided above the rail member 42. Therefore, in the present embodiment, the lock portion 43 engages with an end portion (specifically, the upper end) of the slider 11 of the right controller 4 in the attached state, the details of which will be described later. Then, in the attached state, it is possible to effectively prevent the strap attachment 1 from coming off the right controller 4. In the present embodiment, with the lock portion 43 arranged above the rail member 42, there is no need to provide a lock-related mechanism on the rail member 42, and it is therefore possible to simplify the configuration of the rail member 42. Since the lock portion 43 is located at the upper end of the strap attachment 1, it is easy for a user to operate the lock portion 43.

Note that in other embodiments, the lock portion 43 may be provided at a position of the rail member 42 other than at the upper end of the rail member 42. For example, the lock portion 43 may be provided on the upper side of the center of the rail member 42 in the slide direction. Then, the slider 11 of the right controller 4 has such a shape that the lock portion 43 can engage with the slider 11 in the attached state.

As shown in FIG. 14 and FIG. 15, the lock portion 43 is movable in a direction other than the slide direction. In the present embodiment, the lock portion 43 is movable in a direction that is substantially perpendicular to the slide direction (specifically, the x-axis direction), and is movable between the locked position and the unlocked position (see FIG. 14 and FIG. 15).

As shown in FIG. 14(a) and FIG. 15(a), when the lock portion 43 is located at the locked position, the lock portion 43 blocks a part of the insertion port at the upper end of the rail member 42. The insertion port of the rail member 42 is an area surrounded by the upper end portions of the various sections 51 to 53 of the rail member 42 (in other words, the upper end of the groove described above). That is, when the strap attachment 1 is attached to the right controller 4, the slider 11 of the right controller 4 is inserted into the insertion port. The locked position is a position at which the lock portion 43 protrudes from the bottom surface toward the opposing portion 53 of the rail member 42 (in other words, toward the x-axis negative direction side).

On the other hand, as shown in FIG. 14(*b*) and FIG. 15(*b*), when the lock portion 43 is in the unlocked position, the lock portion 43 leaves open the insertion port at the upper end of the rail member 42 (in other words, does not block the insertion port). The unlocked position is a position at which the lock portion 43 does not protrude (or does not substantially protrude) from the bottom surface of the rail member 42. The unlocked position is a position such that the top surface of the slider 11 does not come into contact with the lock portion 43 during the slide movement of the slider 11 in engagement with the rail member 42.

As described above, the lock portion 43 in the locked position protrudes past a predetermined surface extending along the slide direction (i.e., the bottom surface of the rail member 42), as compared with the lock portion 43 in the unlocked position, thereby allowing the lock portion 43 to interfere with the right controller 4 in the attached state. Thus, the lock portion 43 can assume a position where the right controller 4 is locked and another position where the right controller 4 is not locked (or not substantially locked).

In the present embodiment, the lock portion 43 is movable in a direction that is substantially perpendicular to the slide direction. Even when a force is applied that urges the slider 11 to move upward with respect to the strap attachment 1, it is possible to reduce the possibility that the lock portion 43 is moved by such a force from the locked position to the unlocked position. Thus, even when a force is applied that urges the strap attachment 1 to be detached from the right controller 4, it is possible to reduce the possibility that the strap attachment 1 comes off the right controller 4.

In the present embodiment, the lock portion 43 is biased in the direction from the unlocked position toward the locked position. Specifically, as shown in FIG. 15, the strap attachment 1 includes a spring 61 as a biasing member for biasing the lock portion 43. Being biased by the spring 61, the lock portion 43 is in the locked position in a normal state (i.e., with no force being applied by a user, or the like). This allows the lock portion 43 to continue to lock the right controller 4 in the attached state (even without a user holding the lock portion 43, for example).

Note that there is no particular limitation on the mechanism for biasing the lock portion 43, and mechanisms other than that shown in FIG. 15 may be used in other embodiments. In other embodiments, the strap attachment 1 may include a release button. The release button is configured to move in conjunction with the lock portion 43. Specifically, the release button is configured so that the lock portion 43 moves to the unlocked position in response to the release button being pressed. Then, a user can press the release button to move the lock portion 43 from the locked position to the unlocked position. A user can move the lock portion 43 by means of the release button, without having to operate the lock portion 43 itself, thereby improving the usability for the user.

As shown in FIG. 14 and FIG. 15, the lock portion 43 includes a slope 43*a* that is sloped with respect to the bottom surface of the rail member 42. The slope 43*a* is a surface on the upper end portion (i.e., the y-axis positive direction side) of the lock portion 43 that extends upward while being inclined from the locked position toward the unlocked position. Then, a user can easily move the lock portion 43 to the unlocked position by applying a force so as to push the slope 43*a* toward the unlocked position (or downward). In the present embodiment, in the attached state, the right controller 4 is present beside (i.e., on the x-axis negative direction side of) the lock portion 43. For this, the provision of the slope 43*a* on the lock portion 43 makes it easier for a user to put a finger between the lock portion 43 and the right controller 4 and operate the lock portion 43.

Note that in the present embodiment, a depressed portion 43*b* is formed on the slope 43*a* of the lock portion 43. This allows a user to hold the depressed portion 43*b* with a finger or a fingernail, thus making it easier to operate the lock portion 43. Also, with the provision of the depressed portion 43*b*, when the slider 11 of the right controller 4 is slid on the rail member 42, the second L button 21 and the second R button 22 on the slider 11 are less likely to hit the lock portion 43. Thus, the slider 11 can be more smoothly slid on the rail member 42.

Note that in other embodiments, the strap attachment 1 does not need to have the lock portion 43. Then, in the attached state, the projection 27 of the right controller 4 engages with the rail member 42 of the strap attachment 1. Note that when the strap attachment 1 does not have the lock portion 43, the holding portion 41*b* may be provided without the release button contact surface 41*e* and so as not to be in contact with the release button 28 in the attached state. Then, the release button 28 is not pressed in the attached state, enabling a firmer engagement of the projection 27 with the rail member 42. Note that in such a case, the holding portion 41*b* is shaped so that a user can press the release button 28 in the attached state.

(Attachment Operation)

Figure 16:
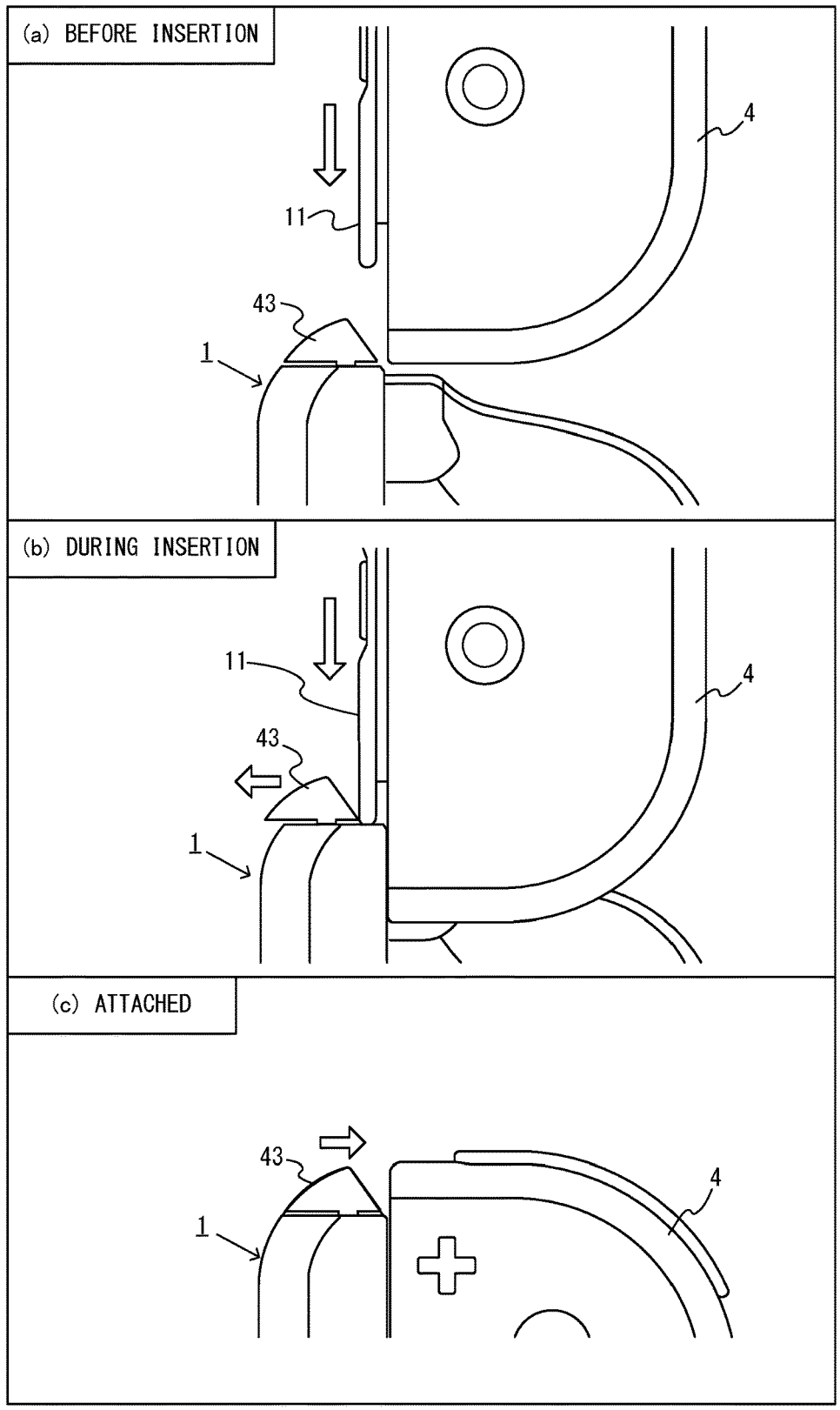
FIG. 16 schematically shows an example operation of attaching a strap attachment to a right controller.

FIG. 16 schematically shows an example operation of attaching the strap attachment to the right controller. Referring to FIG. 16, the operation of attaching the strap attachment 1 to the right controller 4 will now be described.

FIG. 16(*a*) shows a state before the slider 11 of the right controller 4 is inserted into the rail member 42 of the strap attachment 1. In order to attach the strap attachment 1 to the right controller 4, a user inserts the lower end of the slider 11 into the insertion port at the upper end of the rail member 42 as shown in FIG. 16.

FIG. 16(*b*) shows a state in which the slider 11 is inserted into the insertion port of the rail member 42. In the state shown in FIG. 16(*a*), the lock portion 43 is in the locked position, and a user moves the lock portion 43 to the unlocked position to allow the slider 11 to be inserted into the insertion port. A user may move the lock portion 43 to the unlocked position using a finger, or may move the lock portion 43 to the unlocked position by making the slider 11 contact the lock portion 43. In the present embodiment, since the lock portion 43 has the slope 43*a*, a user can smoothly move the lock portion 43 to the unlocked position by moving the slider 11 downward while the slider 11 is in contact with the lock portion 43.

After the slider 11 is inserted into the rail member 42, a user can move the slider 11 further down the rail member 42 (in the downward direction in FIG. 16) to achieve the attached state between the right controller 4 and the strap attachment 1. FIG. 16(*c*) shows the attached state. In the attached state, the lock portion 43 is no longer in contact with the slider 11, and the lock portion 43 therefore returns to the locked position by virtue of the spring 61. Then, the lock portion 43 blocks (at least a part of) the insertion port, interfering with the upper end of the slider 11. Thus, in the attached state, the lock portion 43 can generally prevent the right controller 4 from moving in the removal direction.

(Detachment Operation)

Figure 17:
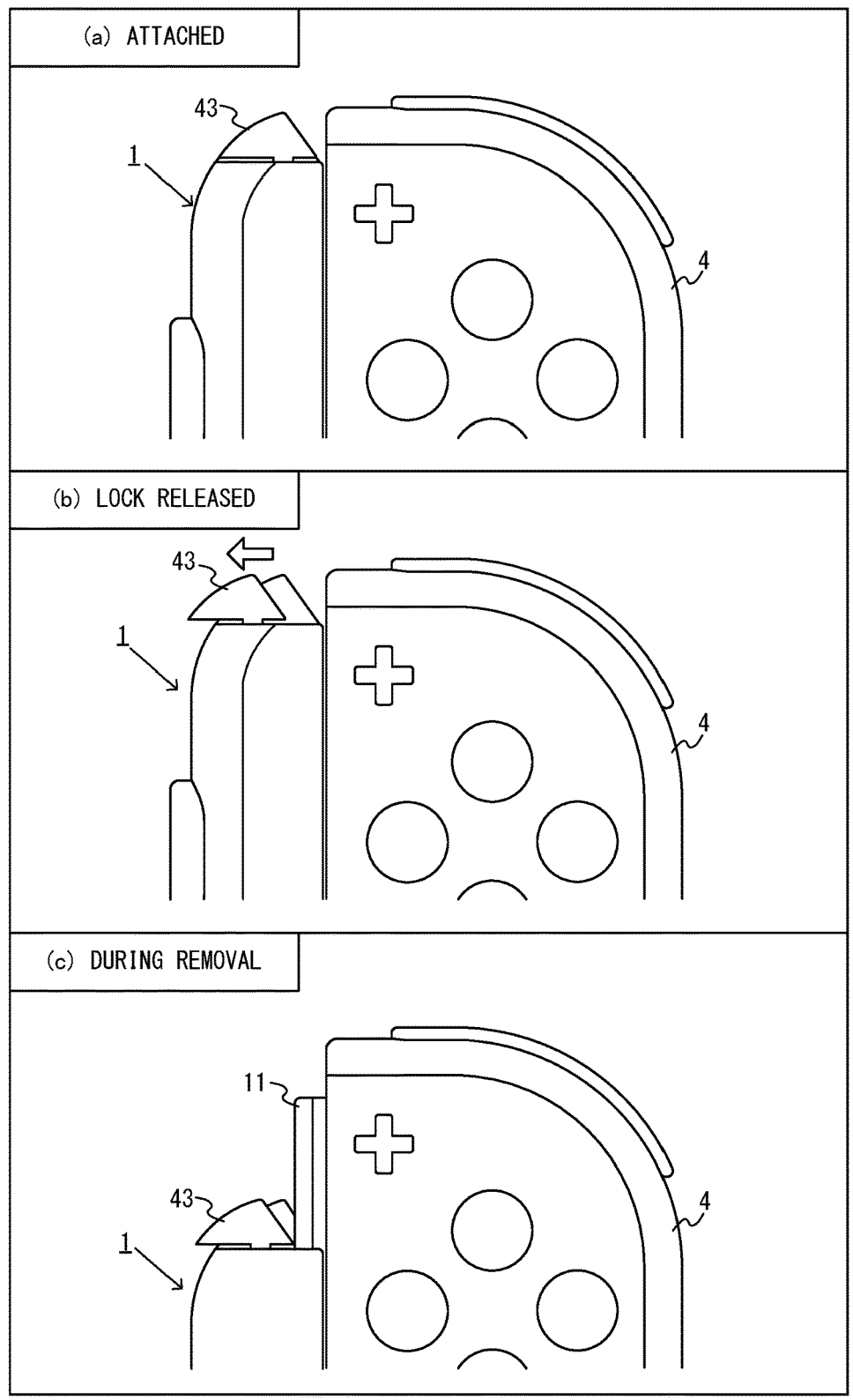
FIG. 17 schematically shows an example operation of detaching a strap attachment from a right controller.

FIG. 17 schematically shows an example operation of detaching the strap attachment from the right controller. Referring to FIG. 17, the operation of detaching the strap attachment 1 from the right controller 4 will now be described.

FIG. 17(a) shows the attached state. In the attached state, in order to remove the strap attachment 1 from the right controller 4, a user moves the lock portion 43 to the unlocked position.

FIG. 17(b) shows a state in which the lock portion 43 has been moved to the unlocked position. In the state in which the lock portion 43 has been moved to the unlocked position, the lock portion 43 leaves open the insertion port of the rail member 42. Then, as shown in FIG. 14(b), the upper end of the slider 11 is exposed through the insertion port, and the lock by the lock portion 43 has been released. Since the slider 11 can move upward with respect to the rail member 42 in this state, a user can remove the strap attachment 1 from the right controller 4 by moving the right controller 4 upward with respect to the strap attachment 1.

FIG. 17(c) shows a state in which the slider 11 has been moved upward with respect to the rail member 42. FIG. 17(c) is a state in which the strap attachment 1 is being detached from the right controller 4. By further moving the slider 11 upward with respect to the rail member 42 from this state, the strap attachment 1 can be detached from the right controller 4. Note that in this state, the lock portion 43 is in contact with the slider 11 and cannot return to the locked position. Therefore, a user can perform the detachment operation with the user's hands off the lock portion 43. After the strap attachment 1 is detached from the right controller 4, the lock portion 43 returns to the locked position.

Note that as described above, in the present embodiment, the release button 28 of the right controller 4 is pressed by the release button contact surface 41e in the attached state, and the projection 27 of the right controller 4 does not (substantially) engage with the rail member 42 of the strap attachment 1. Therefore, a user can perform the detachment operation without having to press the release button 28.

(3-4: Elements Regarding Strap)

Figure 18:
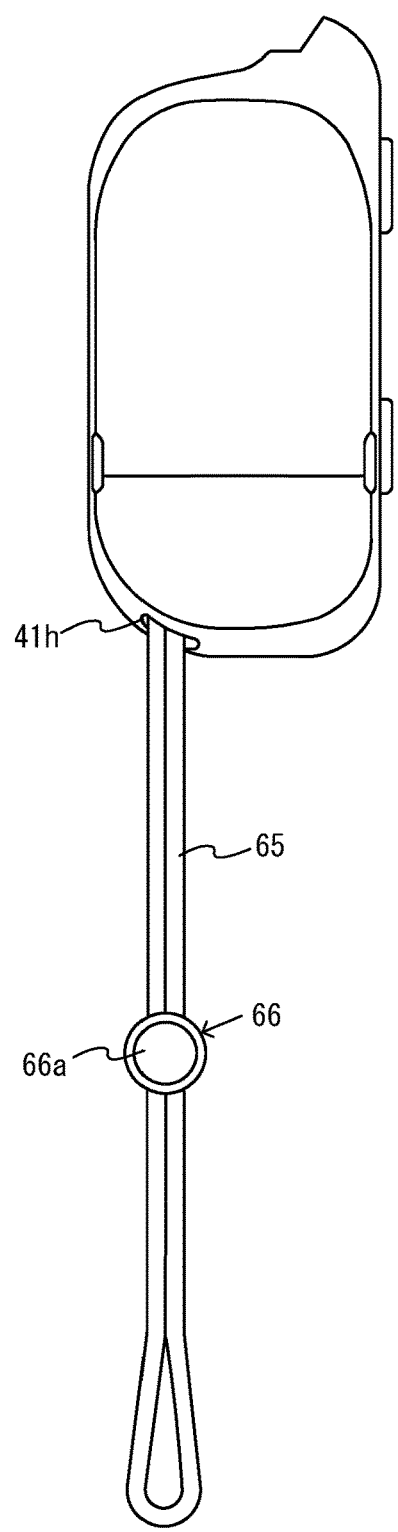
FIG. 18 shows the entirety of an example strap attachment including a strap.

FIG. 18 shows the entirety of an example strap attachment including a strap. As shown in FIG. 18, the strap attachment 1 includes the strap 65. The strap 65 is a cord-like member such as a cord or a rope, and has a loop shape. As described above, the strap 65 is put on the wrist when a user holds a strap-attached controller device.

In the present embodiment, the strap 65 is fixedly fastened to the housing 41. Specifically, a shaft portion is provided inside the housing 41 (specifically, on a lower portion of the housing 41). As shown in FIG. 18, a hole 41h is provided in the housing 41 (specifically, the holding portion 41b). The strap 65 is hooked on the shaft portion, extending out of the housing 41 through the hole 41f. Thus, in the present embodiment, the strap 65 can be fixedly fastened to the housing 41. According to the present embodiment, the strap 65 can be securely fastened to the housing 41.

Note that in other embodiments, the strap attachment 1 may be configured so that the strap is removably attachable to the strap attachment 1. That is, the strap attachment 1 may include a strap anchor to which a strap can be fastened, instead of a strap (or in addition to a strap). For example, the strap anchor may be provided on the housing 41 (more specifically, on a portion of the housing 41 below the center thereof) and may include a hole. Then, a strap can be attached by passing the strap through the hole. Note that in the present embodiment, the strap 65 is fastened to the shaft portion, and the shaft portion is therefore equivalent to the strap anchor. Note that in other embodiments, there is no particular limitation on the position of the strap anchor, and the strap anchor may be provided at the center of the housing 41 or on a portion thereof above the center thereof.

As shown in FIG. 18, the strap 65 includes an adjustment 66 in the present embodiment. The adjustment 66 is a member used for adjusting the length of the loop of the cord-like member of the strap 65. Specifically, the adjustment 66 includes an adjustment button 66a. Although there is no particular limitation on the specific mechanism of the adjustment 66, in the present embodiment, the adjustment 66 can be moved easily on the cord-like member of the strap 65 while the adjustment button 66a is pressed, whereas the adjustment 66 can be fixed (in other words, can be made less movable) on the cord-like member of the strap 65 while the adjustment button 66a is not pressed. Thus, a user can adjust the length of the loop of the cord-like member by using the adjustment 66 so that the strap 65 will not slip off the wrist.

Note that in other embodiments, a strap may be connected to the housing 41 at two positions. For example, a strap may be connected to an upper end portion (i.e., the end portion on the y-axis positive direction side) and a lower end portion (i.e., the end portion on the y-axis negative direction side) of the housing 41 (more specifically, the holding portion 41b). Then, a user holds the strap-attached controller device by putting the hand, finger or fingers, or wrist through between the strap and the housing 41. Also in this way, as in the embodiment described above, it is possible with the strap to control the distance between the user's hand and the strap-attached controller device within a predetermined range. Note that the strap may be a stretchable member such as a rubber, for example.

(3-5: Elements Regarding Buttons)

As shown in FIG. 9, the strap attachment 1 includes the first button 46 and the second button 47. These buttons 46 and 47 are provided so as to allow the second L button 21 and the second R 22 button of the right controller 4 to be operated when the strap attachment 1 is attached to the right controller 4.

As shown in FIG. 9, the buttons 46 and 47 are provided so as to protrude from the button provision surface of the housing 41. The first button 46 is provided at a position on the button provision surface on the lower side of the center in the up-down direction (i.e., the y-axis direction). The second button 47 is provided at a position on the button provision surface on the upper side of the center in the up-down direction.

The buttons 46 and 47 are biased to protrude from the button provision surface. Specifically, the first button 46 is biased by a spring provided inside the housing 41, and the second button 47 is biased by a spring provided inside the housing 41. When the button 46 or 47 is not pressed, the operation surface thereof (i.e., the surfaces on the x-axis positive direction side) is protruding from the button provision surface by a predetermined first distance. The button 46 or 47 can be pressed by a user up to such a position that the operation surface thereof is at a predetermined second distance (the second distance is shorter than the first distance) from the button provision surface.

As shown in FIG. 9, the first button 46 includes a first actuation portion 46a. The first actuation portion 46a is provided so as to protrude toward the opposite side from the operation surface of the first button 46. The first actuation portion 46a is configured so that it can move in such a direction as to protrude from the surface opposite to the operation surface, i.e., move from a first actuation position (FIG. 19(a)) to a second actuation position (FIG. 19(b)), in response to the first button 46 being pressed. The second button 47 includes a second actuation portion 47a. The second actuation portion 47a is provided so as to protrude toward the opposite side from the operation surface of the second button 47. The first actuation portion 47a is configured so that it can move from a third actuation position to a forth actuation position in response to the second button 47 being pressed. Each of the actuation portions 46a and 47a is a rod-shaped member (see FIG. 20).

As shown in FIG. 10, holes 42a and 42b are provided in the rail member 42. Although not shown in the figures, the engaging surface of the housing 41 has holes at positions corresponding to the holes 42a and 42b. The first actuation portion 46a is provided so that the first actuation portion 46a can protrude from the bottom surface of the rail member 42 through the hole 42a. The second actuation portion 47a is provided so that the second actuation portion 47a can protrude from the bottom surface of the rail member 42 through the hole 42b. The position at which the first actuation portion 46a protrudes from the bottom surface is a position that substantially corresponds to the second L button 21 of the right controller 4 in the attached state. That is, the position at which the first actuation portion 46a protrudes from the bottom surface is a position that corresponds to the position of the second L button 21 in the attached state and that is the same position as the position of the second L button 21 in the attached state in the up-down direction (i.e., the y-axis direction) and the front-rear direction (i.e., the z-axis direction). Also with the second actuation portion 47a, as with the first actuation portion 46a, the position at which the second actuation portion 47a protrudes from the bottom surface is a position that corresponds to the second R button 22 of the right controller 4 in the attached state.

Figure 19:
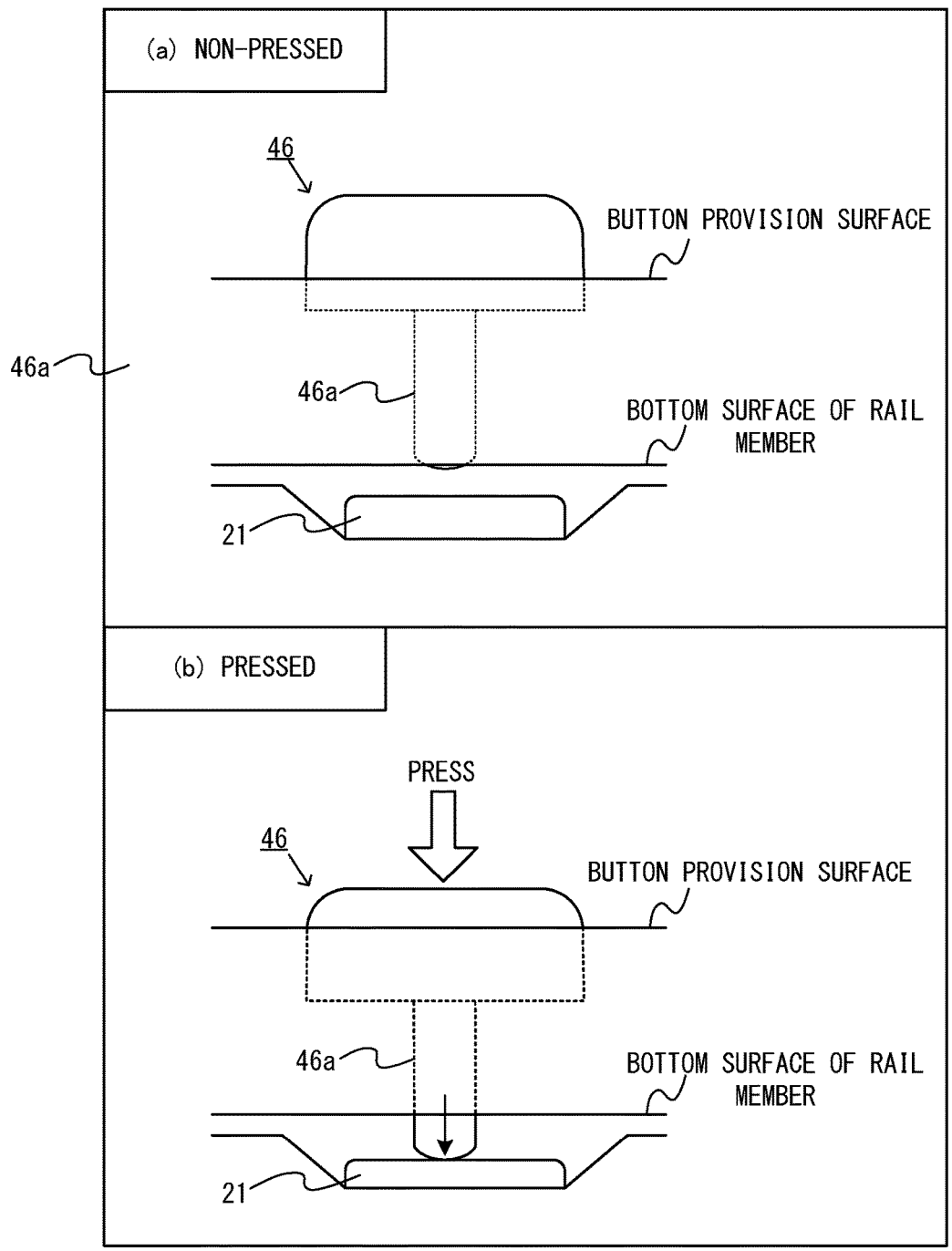
FIG. 19 schematically shows an example of how a button on a controller is pressed by a button on a strap attachment.

Note that the cross-sectional area of the actuation portion along the cross section perpendicular to the direction of protrusion (specifically, the cross-sectional area along the cross section parallel to the yz plane) is smaller than the area of the operation surface of the button on which the actuation portion is provided (see FIG. 19). Then, the holes 42a and 42b through which the actuation portions 46a and 47a pass can be made smaller than the operation surfaces of the buttons 46 and 47. In other words, it is possible to increase the size of the buttons 46 and 47 for easier operations without increasing the size of the holes 42a and 42b to be provided running through the rail member and/or the housing.

FIG. 19 schematically shows an example of how a button on the controller is pressed by a button on the strap attachment. Note that although FIG. 19 shows an example where the right controller 4 is attached to the strap attachment 1 and the second L button 21 is pressed by the first button 46, the above description holds true also for other cases (i.e., where the second L button of the right controller 4 is pressed by the second button 47).

FIG. 19(a) shows a state in which the first button 46 is not pressed (the non-pressed state). In the non-pressed state, the first actuation portion 46a protrudes only slightly from the bottom surface of the rail member 42. Therefore, the first actuation portion 46a does not press the second L button 21. In the non-pressed state, the first actuation portion 46a is not in contact with the slider 11 (specifically, the top surface of the slider 11). Note that in other embodiments, in the non-pressed state, the first actuation portion 46a may be retracted inside the housing 41, without protruding from the bottom surface of the rail member 42.

On the other hand, FIG. 19(b) shows a state in which the first button 46 is pressed (pressed state). In the pressed state, the first actuation portion 46a is protruding past the bottom surface of the rail member 42. Then, the first actuation portion 46a presses the second L button 21. That is, in the attached state, a user can press the first button 46, thereby in turn pressing the second L button 21.

As described above, in the present embodiment, even when the strap attachment 1 is attached to the right controller 4, a user can press buttons provided on the strap attachment 1 to thereby operate the second L button 21 and the second R 22 button on the right controller 4 (which are hidden by the strap attachment 1).

Note that when a user holds the strap-attached controller device using both hands, a user can operate the first button 46 and the second button 47 using the index finger and/or the middle finger, for example. That is, a user can operate the buttons 46 and 47 using the same fingers as those used when operating the second L button 21 and the second R button 22 when the strap attachment 1 is not attached.

In the present embodiment, the area of the operation surface of a button on the strap attachment 1 (i.e., the first button 46 or the second button 47) is greater than the area of the operation surface of a button on the right controller 4 (i.e., the second L button 21 or the second R button 22). Therefore, in the present embodiment, it is easier for a user to press a button on the strap attachment 1 attached to the right controller 4 than to directly press a button on the right controller 4. That is, it is possible to improve the controllability of the right controller 4 by attaching the strap attachment 1 to the right controller 4.

Note that in the present embodiment, the pairing button 23 provided on the slider 11 of the right controller 4 cannot be operated by a user when the strap attachment 1 is attached to the right controller 4. This is because it is assumed that the pairing button 23 is a button used when instructing a process regarding the wireless communication between the right controller 4 and the main unit 2 and that the pairing button 23 is not used while operating the right controller 4 (e.g., during game operations). Note that in other embodiments, a button corresponding to the pairing button 23 may be provided on the strap attachment 1 so as to allow the pairing button 23 to be operated in the attached state.

Figure 20:
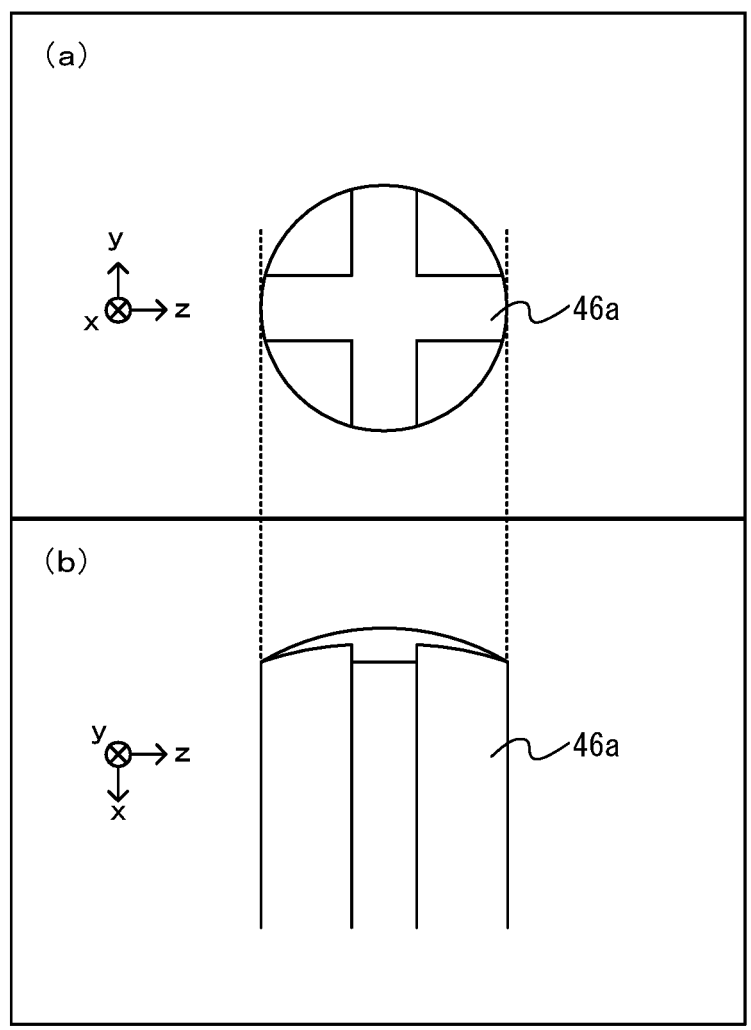
FIG. 20 shows an example actuation portion.

FIG. 20 shows an example actuation portion. Note that while FIG. 20 shows the first actuation portion 46a shown in FIG. 9, the second actuation portion 47a has a similar shape to the first actuation portion 46a.

FIG. 20(a) shows the first actuation portion 46a as seen from the direction of protrusion (i.e., from the x-axis negative direction side). As shown in FIG. 20(a), the first actuation portion 46a has a cross-shaped cross section along a plane perpendicular to the direction of protrusion. Then, it is possible to reduce the volume of the actuation portion 46a while maintaining the mechanical strength thereof. Note that in other embodiments, the first actuation portion 46a may have a cylindrical shape or a columnar shape, for example.

FIG. 20(b) shows the first actuation portion 46a as seen from a direction perpendicular to the direction of protrusion (i.e., from the y-axis negative direction side). As shown in FIG. 20(b), the tip of the first actuation portion 46a has a curved surface (specifically, a curved surface such that the center thereof is protruding). Then, when a button on the right controller 4 is pressed by the first actuation portion 46a, it is possible to reduce the possibility that the button on the right controller 4 is damaged by the first actuation portion 46a. Even if a user attempts to remove the strap attachment 1 from the right controller 4 in a state in which the first button 46 or the second button 47 is being pressed (i.e., a state in which a button on the right controller 4 is being pressed by the first actuation portion 46*a* or the second actuation portion 47*a*), it is possible to reduce the possibility that the actuation portion 46*a* or 47*a* gets caught on the steps on the slider 11 (specifically, steps provided around the buttons 21 to 23).

(3-6: Elements Regarding Lightguide)

The strap attachment 1 includes elements for allowing a user to see the light from the indicator LEDs of the controller attached thereto. The indicator LED of each of the controllers 3 and 4 may be lit to indicate the number assigned to the controller, or may be lit to indicate the remaining battery level of the controller. In such a case, with the elements described above, a user can see the light from the indicator LED of the controller even if the strap attachment 1 is attached to the controller. This will be described below in detail.

Figure 21:
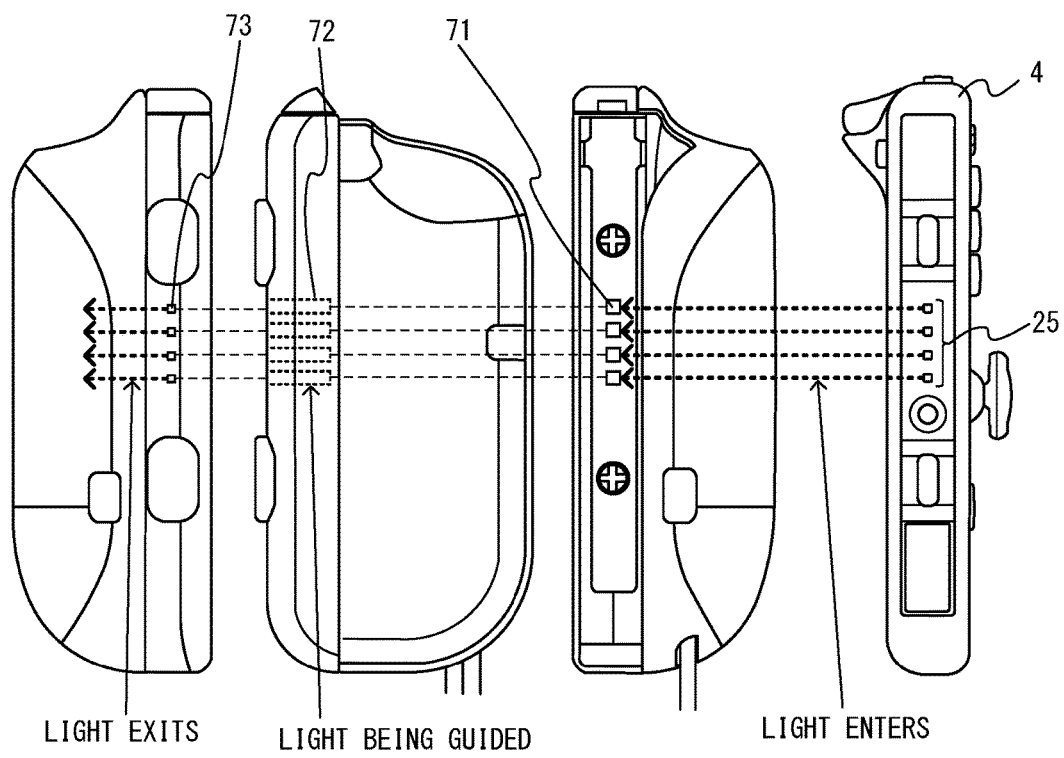
FIG. 21 shows an example of how light from indicator LEDs of a right controller exits light-exiting ports of a strap attachment.

As shown in FIG. 9, light-receiving ports 71 (i.e., holes in which the light-receiving surfaces of a lightguide member 72 shown in FIG. 21 are provided) are provided on the bottom surface of the rail member 42 (and the engaging surface of the housing 41). The number of the light-receiving ports 71 is equal to the number (herein, four) of indicator LEDs 25 of the right controller 4. The light-receiving ports 71 are provided at positions corresponding to the indicator LEDs 25 of the right controller 4 attached to the strap attachment 1. That is, the positions of the light-receiving ports 71 are substantially opposing the positions of the indicator LEDs 25 in the attached state, and are more specifically the same positions as those of the indicator LEDs 25 in the attached state with respect to the up-down direction (i.e., the y-axis direction) and the front-rear direction (i.e., the z-axis direction).

As shown in FIG. 9, light-exiting ports 73 (i.e., holes in which light-exiting surfaces of the lightguide member 72 are provided) are provided on the housing 41. The light-exiting ports correspond to four light-receiving ports, and the number of light-exiting ports is equal to the number (herein, four) of the light-receiving ports. In the present embodiment, the light-exiting ports 73 are provided on the button provision surface of the housing 41 (see FIG. 9). More specifically, the light-exiting ports 73 are provided between the first button 46 and the second button 47. Note that in other embodiments, the light-exiting ports 73 may be provided on any surface that is different from the bottom surface (in other words, the engaging surface) of the rail member 42. For example, in other embodiments, the light-exiting ports 73 may be provided on the front surface or the rear surface of the housing 41.

FIG. 21 shows an example of how light from indicator LEDs of a right controller exits light-exiting ports of a strap attachment. As shown in FIG. 21, the strap attachment 1 includes the lightguide member 72 inside the housing 41 (more specifically, the attachment portion 41*a*). The lightguide member 72 is a transparent member (specifically, a lens) formed from a resin, for example. The lightguide member 72 includes a number of lenses equal to the number (herein, four) of the light-receiving ports 71 and the light-exiting ports 73. In the present embodiment, for easier production, the lightguide member 72 is an integrally-molded piece including four lenses connected together. Note however that in other embodiments, the lenses may be provided as separate pieces. As shown in FIG. 21, the lenses of the lightguide member 72 are arranged so that the light-receiving surfaces (i.e., surfaces on the x-axis negative direction side) are in the vicinity of the light-receiving ports 71, respectively, and the light-exiting surfaces (i.e., surfaces on the x-axis positive direction side) are in the vicinity of the light-exiting ports 73, respectively.

Note that in the present embodiment, the light-receiving surfaces of the lightguide member 72 are provided at positions sunken from the bottom surface of the rail member 42 (in other words, at positions that are closer to the center of the housing 41). Then, it is possible to reduce the possibility that the lightguide member 72 comes into contact with the right controller 4 when inserting the slider 11 of the right controller 4 into the rail member 42, thereby allowing the strap attachment 1 to be smoothly attached to the right controller 4.

As shown in FIG. 21, when an indicator LED 25 of the right controller 4 emits light in the attached state, the light from the indicator LED 25 enters the light-receiving surface of the lightguide member 72 through the light-receiving port 71 opposing the indicator LED 25 that is lit. The lightguide member 72 guides light incident upon the light-receiving surface to the light-exiting surface by virtue of internal reflection, and the light exits the light-exiting surface. Thus, light is output from the light-exiting port 73.

Note that in other embodiments, the lightguide member 72 may be any member capable of guiding light incident upon the light-receiving port 71 to the light-exiting port 73. For example, in other embodiments, the lightguide member may be a mirror provided on the wall of the holes connecting between the light-receiving ports 71 and the light-exiting ports 73.

As described above, in the present embodiment, the strap attachment 1 includes a lightguide portion (herein, the lightguide member 72) for guiding light incident on a light-receiving port 71 provided on the bottom surface of the rail member 42 to a light-exiting port provided on a surface (herein, the button provision surface) different from the bottom surface. Then, even when the strap attachment 1 is attached to the right controller 4, the light from an indicator LED 25 of the right controller 4 can be presented to a user, as when the strap attachment 1 is not attached to the right controller 4. By the provision of the lightguide portion, it is possible to present to a user information indicated by the indicator LEDs 25 of the right controller 4 to which the strap attachment 1 is attached using a simple configuration (e.g., as compared with an embodiment in which the strap attachment 1 receives information regarding indicator LEDs 25 from the right controller 4 so as to control indicator LEDs 25 of the strap attachment 1 based on the received information).

Note that in the present embodiment, the light-exiting ports 73 are provided on the button provision surface of the housing 41 (see FIG. 9). Then, the orientation of the light-exiting ports 73 of the strap attachment 1 attached to the right controller 4 is the same as the orientation of the indicator LEDs 25 of the right controller 4, and it is therefore possible to present light from the light-exiting ports 73 in such a manner that the light is easy for a user to see.

In the present embodiment, the light-exiting ports 73 are provided on the button provision surface between the first button 46 and the second button 47 (see FIG. 9). Then, the positional relationship between the two buttons 46 and 47 and the light-exiting ports 73 on the strap attachment 1 can be made the same as the positional relationship between two buttons (i.e., the second L button 21 and the second R button 22) and the indicator LEDs 25 on the right controller 4. Then, a user can operate the right controller 4 in the same fashion whether or not the strap attachment 1 is attached to the right controller 4, thus improving the controllability of the controller when the strap attachment 1 is attached thereto. Moreover, even when a user is operating the buttons 46 and 47, light from the light-exiting ports 73 is easy to see for the user.

In the present embodiment, light from a plurality of indicator LEDs 25 of the right controller 4 is output from a plurality of light-exiting ports 73 corresponding respectively to the indicator LEDs 25. Therefore, in the present embodiment, a user can recognize which one or ones of the indicator LEDs 25 are lit.

Note that in other embodiments, the strap attachment 1 may include one light-receiving port and one light-exiting port even though the right controller 4 includes a plurality of indicator LEDs 25. Then, when any of the indicator LEDs 25 of the right controller 4 is lit, light is output from the light-exiting port of the strap attachment 1. Then, although it is not possible to indicate which one of the indicator LEDs 25 of the right controller 4 is lit, it is possible to indicate to a user that at least one of the indicator LEDs 25 is lit. Depending on the content of information to be indicated by indicator LEDs 25 to a user, this configuration may suffice.

Note that in other embodiments, partitions may be provided between a plurality of light-receiving ports (in other words, a plurality of light-receiving surfaces) arranged next to each other. Then, it is possible to reduce the possibility that light from one indicator LED is incident upon another light-receiving port that is different from the corresponding light-receiving port, and it is possible to reduce the possibility that light is output from a light-exiting surface that does not correspond to the indicator LED that is lit.

4. Functions/effects and Variations of Present Embodiment

In the embodiment described above, the strap attachment 1 is an attachment attachable to a game controller (e.g., the right controller 4). Note that the game controller has a controller-side slide portion (e.g., the slider 11) on which controller-side first operation buttons (e.g., the second L button 21 or the second R button 22) are provided.

The strap attachment 1 includes the following elements:
a strap;
an attachment-side slide portion (e.g., the rail member 42) on a first surface (e.g., the engaging surface) of the attachment, the attachment-side slide portion having a first side of a center of the attachment-side slide portion and a second side of a center of the attachment-side slide portion opposite to each other in a predetermined slide direction (e.g., the y-axis direction shown in FIG. 9), wherein the attachment-side slide portion is configured to slidably engage with a controller-side slide portion in the slide direction, and wherein the controller-side slide portion is insertable into the attachment-side slide portion from the first side (e.g., the y-axis positive direction side shown in FIG. 9);
a lock portion (e.g., the lock portion 43) on the first side of the center of the attachment-side slide portion and configured to resist the slide movement, in a removal direction opposite to the insertion direction, in a state in which the controller slide portion has been inserted into the attachment-side slide portion, thereby attaching the game controller to the attachment; and
an attachment-side first operation button (e.g., the first button 46 or the second button 47) on a second surface (e.g., the button provision surface) on a reverse side from the first surface.

The attachment-side first operation button includes a first actuation portion (e.g., the first actuation portion 46a or the second actuation portion 47a shown in FIG. 9) configured to be movable in such a direction as to protrude from the first surface, thereby pressing a controller-side first operation button, in response to an operation of pressing the attachment-side first operation button.

As described above, with the slide portion of the attachment and the slide portion of the game controller engaged with each other, a user can easily detach the attachment (including the strap) from the game controller. That is, it is possible to easily detach the strap from the game controller.

The term "slide member" may refer to the rail member or the slider as used in the embodiment described above. Note that in the embodiment described above, a slide member provided on the strap attachment 1 and a slide member provided on the controller are referred to as a "rail member" and a "slider", respectively, so that these members can easily be distinguished from each other. The shape of the rail member and that of the slider are not limited to those of the embodiment described above. For example, a slide member having a cross section shaped as shown in FIG. 11 may be referred to as a "slider", and a slide member having a T-shaped cross section as shown in FIG. 7 may be referred to as a "rail member".

Note that in the embodiment described above, the rail member, which is an example slide member, is provided on the engaging surface of the housing 41, and is configured to have the bottom surface portion, the side surface portion and the opposing portion. In other embodiments, the housing and the rail member (in other words, the slide member) may be configured as follows. That is, the strap attachment 1 may include a member A (e.g., a housing without the engaging surface described above) forming a part of the housing and including an opening, and a member B (e.g., the rail member 42 described above) including the bottom surface portion, the side surface portion and the opposing portion. Then, the bottom surface portion of the member B is connected to the member A so as to cover at least a portion of the opening of the member A. With such a configuration, the surface of the bottom surface portion of the member B corresponds to the "first surface" described above, and the side surface portion and the opposing portion of the member B correspond to the "rail member" described above. Thus, the rail member may not have the bottom surface portion. For example, the strap attachment 1 may be configured so that the rail member includes the side surface portion and the opposing portion (while not including the bottom surface portion), wherein the side surface portion is connected to the engaging surface of the housing.

According to the above description, since the attachment includes the actuation portion, a user can operate operation buttons on the game controller by pressing the operation buttons provided on the attachment even if the attachment is attached to the game controller.

According to the above description, since the attachment includes the lock portion, it is possible to reduce the possibility that the attachment comes off the game controller as a result of the controller-side slide portion, which has been inserted into the attachment-side slide portion, moving in the removal direction.

Note that "resisting (the slide movement)" as used herein means limiting (in other words, generally preventing) the slide movement through engagement between one member and another member. Note however that "resisting (the slide movement)" means to prevent the slide movement with a force less than a certain level, and means that the slide movement may be allowed when a force greater than a certain level is applied (thereby releasing the engagement).

It can be said that the strap attachment 1 of the embodiment described above is an attachment attachable to a game controller (e.g., the right controller 4) having a controller-side slide portion (e.g., the slider 11). The strap attachment 1 includes the following elements:

- an attachment-side slide portion (e.g., the rail member 42) on a first surface (e.g., the engaging surface) of the attachment, the attachment-side slide portion having a first side of a center of the attachment-side slide portion and a second side of a center of the attachment-side slide portion opposite to each other in a predetermined slide direction (e.g., the y-axis direction shown in FIG. 9), wherein the attachment-side slide portion is configured to slidably engage with a controller-side slide portion in the slide direction, and wherein the controller-side slide portion is insertable into the attachment-side slide portion from the first side (e.g., the y-axis positive direction side shown in FIG. 9);
- a lock portion (e.g., the lock portion 43) on the first side of the center of the attachment-side slide portion and configured to resist the slide movement, in a removal direction opposite to the insertion direction, in a state in which the controller slide portion has been inserted into the attachment-side slide portion, thereby attaching the game controller to the attachment; and
- a strap anchor (e.g., the shaft portion provided inside the housing 41) to which a strap can be fastened, wherein the strap anchor is a portion of the attachment which portion is on the same side of the center of the attachment in the slide direction as the second side.

Then, by engaging the slide portion of the attachment with the slide portion of the game controller, a user can easily detach the attachment (including the strap) from the game controller. If a strap is fastened to the strap anchor of the attachment, a user can detach the attachment from the controller, thereby removing the strap from the controller, without having to remove the strap from the attachment. That is, it is possible to easily detach the strap from the game controller.

(Variation Regarding Housing)

In the embodiment described above, the housing 41 of the strap attachment 1, in the attached state, opposes the side surface and the reverse surface (in other words, covers the side surface and the reverse surface) of the right controller 4. In other embodiments, there is no particular limitation on the shape of the housing of the strap attachment. For example, as in a variation to be described below, the housing of the strap attachment may be attached to the controller so as to oppose one predetermined surface of the controller.

Figure 22:
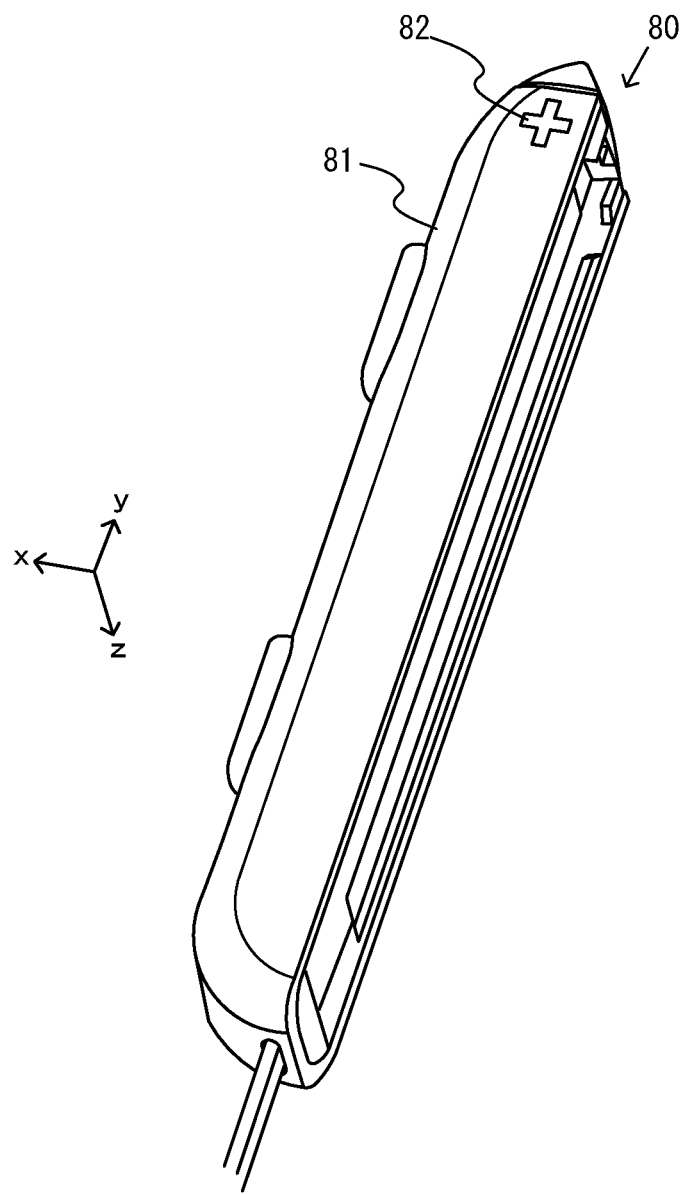
FIG. 22 shows an example strap attachment according to a variation of the embodiment.

FIG. 22 shows an example strap attachment according to a variation of the embodiment described above. In FIG. 22, a strap attachment 80 of this variation includes a housing 81. The housing 81 has a shape similar to that of the attachment portion 41*a* of the housing 41 in the embodiment described above. Note that the housing 81 has the rear surface (i.e., the surface on the z-axis positive direction side). The housing 81 also has the engaging surface and the button provision surface as does the attachment portion 41*a* of the housing 41 in the embodiment described above.

The strap attachment 80 of this variation is different from the strap attachment 1 of the embodiment described above in that the strap attachment 80 does not have the holding portion 41*b* (including elements provided on the holding portion 41*b*). Otherwise, the strap attachment 80 is similar to the strap attachment 1. That is, the strap attachment 80 includes the rail member 42, the lock portion 43, the buttons 46 and 47, the strap 65 and the lightguide member 72. Note that the strap attachment 80 does not need to include the terminal 55.

Figure 23:
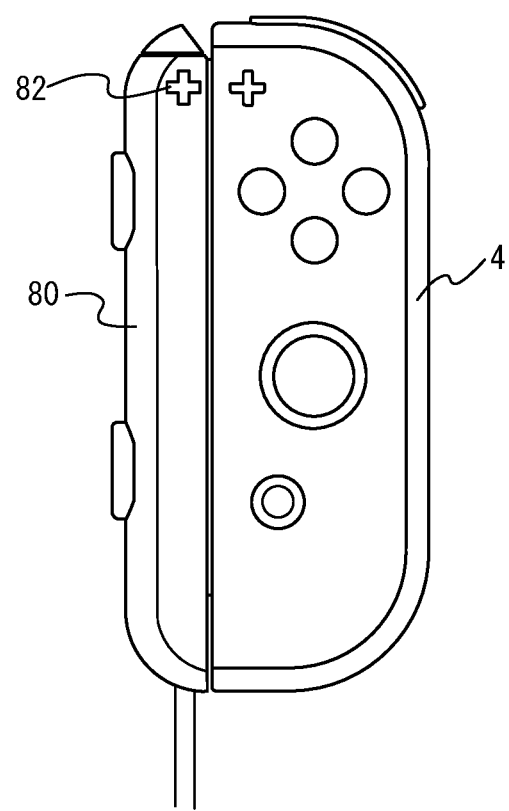
FIG. 23 shows an example of how a strap attachment according to a variation is attached to a right controller.

With such a configuration, the strap attachment 80 is attachable to the right controller 4 as is the strap attachment 1 of the embodiment described above. FIG. 23 shows an example of how the strap attachment of the variation is attached to the right controller.

As described above, the configuration of the slider 11 of the right controller 4 is similar to that of the slider of the left controller 3 in the embodiment described above. Therefore, in the embodiment described above, the rail member 42 of the strap attachment 1 can slidably engage not only with the slider 11 of the right controller 4 but also with the slider of the left controller 3. Note however that since the strap attachment 1 includes the holding portion 41*b*, if one attempts to attach the strap attachment 1 to the left controller 3, the analog stick of the left controller 3 hits the holding portion 41*b*, for example, and it is therefore not possible to attach the strap attachment 1 to the left controller 3.

Figure 24:
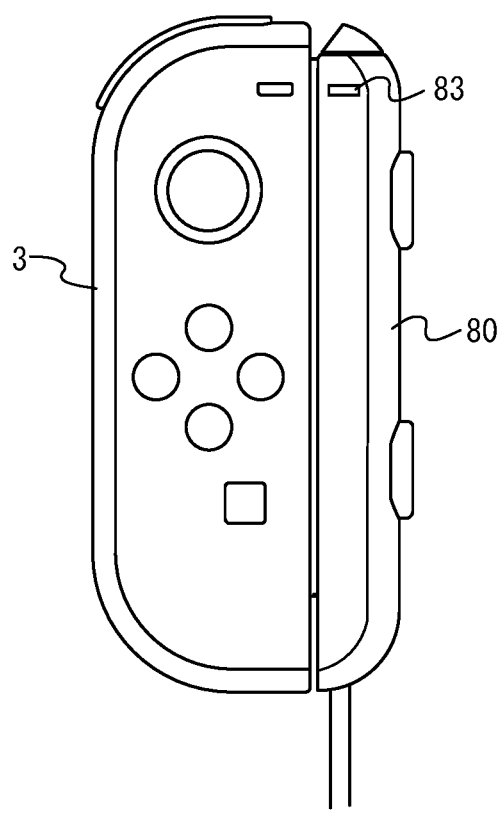
FIG. 24 shows an example of how a strap attachment according to a variation is attached to a left controller.

In contrast, the strap attachment 80 of this variation does not have an element corresponding to the holding portion 41*b*, and it can therefore be attached not only to the right controller 4 but also to the left controller 3. FIG. 24 shows an example of how the strap attachment according to the variation is attached to the left controller. Note that as shown in FIG. 23 and FIG. 24, the direction of the strap attachment 80 is reversed between when the strap attachment 80 is attached to the left controller 3 and when the strap attachment 80 is attached to the right controller 4.

Note that whether the strap attachment 80 is attached to the left controller 3 or the right controller 4, the strap attachment 80 can lock the controller by means of the lock portion 43.

In this variation, the rail member 42 may include no cut-out portion C1 (or substantially no cut-out portion C1) in the opposing portion 53. In this variation, since the strap attachment 80 does not include the holding portion 41*b* and does not include the release button contact surface 41*e*, the release button 28 of the right controller 4 is not pressed in the attached state. Therefore, when the rail member 42 includes the cut-out portion C1, the projection 27 of the right controller 4 engages with the cut-out portion C1. Accordingly, in order to remove the strap attachment 80 from the right controller 4, a user presses the release button 28.

In contrast, when the rail member 42 includes no (or substantially no) cut-out portion C1, the projection 27 does not engage (or does not substantially engage) with the rail member 42 in the attached state, and a user does not need to press the release button 28 in order to remove the strap attachment 80 from the right controller 4. Thus, when the rail member 42 has no cut-out portion C1, a user can more easily remove the attachment.

In this variation, two surfaces between the engaging surface and the button provision surface (i.e., the front surface and the rear surface; in other words, the surface on the z-axis negative direction side and the surface on the z-axis positive direction side) are marked with different marks. Specifically, as shown in FIG. 23, the front surface of the housing 81 is marked with a plus mark 82 representing "+", and the rear surface of the housing 81 is marked with a minus mark 83 representing "−".

These marks 82 and 83 are provided so that a user can recognize the orientation of the strap attachment 80 to be attached to the two different controllers 3 and 4. That is, when the strap attachment 80 is attached to the right controller 4, which has a "+"-shaped button 17 on the primary surface, the plus mark 82 prompts a user to attach the strap attachment 80 so that the front surface of the housing 81 marked with the plus mark 82 is facing the same direction as the primary surface of the right controller 4 (see FIG. 23). When the strap attachment 80 is attached to the left controller 3, which has a "−"-shaped button on the primary surface, the minus mark 83 prompts a user to attach the strap attachment 80 so that the rear surface of the housing 81 marked with the minus mark 83 is facing the same direction as the primary surface of the left controller 3 (see FIG. 24). Thus, it is possible to present to a user, in an easy-to-understand manner, the orientation of the strap attachment 80 to be attached to the controller 3 or 4.

Note that in other embodiments, other methods of distinction may be used in addition to (or instead of) the marks 82 and 83. For example, in other embodiments, the front surface side and the rear surface side of the housing 81 may different from each other in appearance (e.g., color, pattern or texture (specifically, the present/absence of a luster)). The appearance of the primary surface of the left controller 3 may be the same as (or similar to) that of the front surface of the housing 81, or the appearance of the primary surface of the right controller 4 may be the same as (or similar to) that of the rear surface of the housing 81.

(Variation Regarding Lock Portion)

Figure 25:
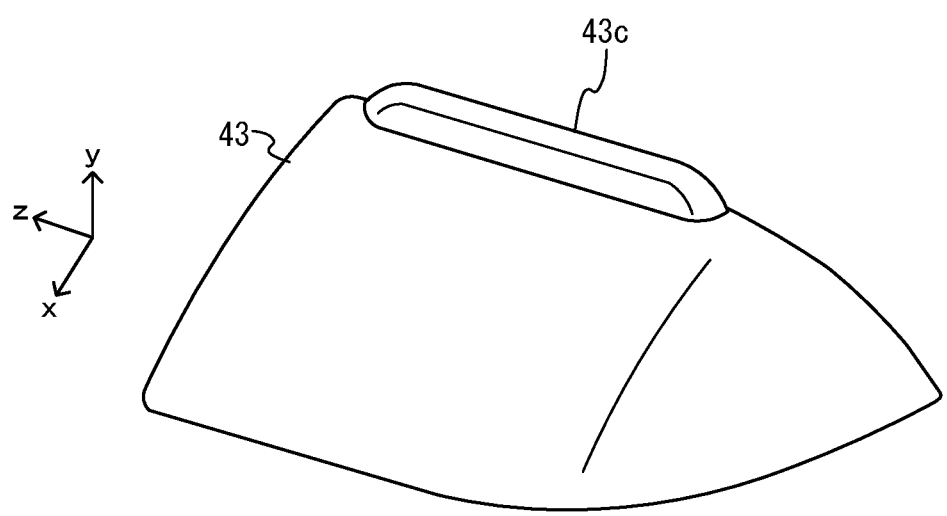
FIG. 25 shows an example lock portion according to a variation.

FIG. 25 shows an example lock portion according to a variation of the present embodiment. As shown in FIG. 25, in other embodiments, the lock portion 43 may have a projection 43c at the upper end portion thereof (i.e., the end portion on the y-axis positive direction side). This allows a user to hold the projection 43c with a finger or a fingernail, thus making it easier to operate the lock portion 43. Note that the projection 43c is provided so as to extend in the front-rear direction (i.e., the z-axis direction), for example. This makes it easier for a user to hold the projection 43c with a finger or a fingernail.

In the embodiment described above, the strap attachment 1 is an attachment that is attachable to a game controller including a controller-side slide portion. The strap attachment 1 includes the following elements:

an attachment-side slide portion on a first surface of the attachment, the attachment-side slide portion having a first side of a center of the attachment-side slide portion and a second side of the center of the attachment-slide portion opposite to each other in a predetermined slide direction, wherein the attachment-side slide portion is configured to slidably engage with the controller-side slide portion in the slide direction, and wherein the controller-side slide portion is insertable into the attachment-side slide portion from the first side;

a lock portion on the first side of the center of the attachment-side slide portion and configured to generally prevent a slide movement, in a removal direction opposite to the insertion direction, of the controller-side slide portion in a state in which the controller-side slide portion has been inserted into the attachment-side slide portion, thereby attaching the game controller to the attachment;

a terminal portion (e.g., the terminal 55) on the second side of the center of the attachment-side slide portion, with a surface thereof facing the first surface being exposed, configured to be electrically connected to a terminal of the game controller with the attachment attached thereto; and a battery configured to supply power to the game controller via the terminal.

With such a configuration, with the slide portion of the attachment and the slide portion of the game controller engaged with each other, a user can easily remove the attachment (including the battery) from the game controller. The attachment having such a configuration may or may not include a strap (or a strap anchor).

As described above, the embodiment described above is applicable to an attachment that can be attached to a game controller, for example, with the aim of making it easier to remove a strap, for example.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An attachment which is attachable to a game controller including a controller-side slide portion that includes a controller-side first operation button, the attachment comprising:
    a strap;
    an attachment-side slide portion on a first surface of the attachment, the attachment-side slide portion having a first side of a center of the attachment-side slide portion and a second side of the center of the attachment-slide portion opposite to each other in a predetermined slide direction, wherein the attachment-side slide portion is configured to slidably engage with the controller-side slide portion in the slide direction, and wherein the controller-side slide portion is insertable into the attachment-side slide portion from the first side;
    a lock portion on the first side of the center of the attachment-side slide portion and configured to generally prevent a slide movement, in a removal direction opposite to an insertion direction, of the controller-side slide portion in a state in which the controller-side slide portion has been inserted into the attachment-side slide portion, thereby attaching the game controller to the attachment; and
    an attachment-side first operation button on a second surface which is on a reverse side of the first surface, wherein the attachment-side first operation button includes a first actuation portion configured to move from a first position to a second position, thereby pressing the controller-side first operation button, in response to an operation of pressing the attachment-side first operation button.

2. The attachment according to claim 1, further comprising a strap anchor to which the strap can be fastened, wherein the strap anchor is on a portion of the attachment which is on the same side of a center of the attachment in the slide direction as the second side.

3. The attachment according to claim 1, wherein the lock portion is at an end portion on the first side of the attachment-side slide portion.

4. The attachment according to claim 1, wherein the lock portion engages with an end portion of the controller-side slide portion of the game controller with the attachment attached thereto.

5. The attachment according to claim 1, wherein:
    the lock portion is configured to move between a third position and a fourth position in a direction different from the slide direction; and
    the lock portion in the third position protrudes more than in the fourth position, thereby engaging with the game controller with the attachment attached thereto.

6. The attachment according to claim 5, wherein the lock portion is configured to move in a direction that is substantially perpendicular to the slide direction.

7. The attachment according to claim 5, further comprising a biasing portion that biases the lock portion in a direction from the fourth position to the third position.

8. The attachment according to claim 5, wherein the lock portion includes a slope at an end portion on the first side that is sloped in a direction from the third position to the fourth position while extending toward the first side.

9. The attachment according to claim 1, wherein:
the lock portion is configured to move between a third position and a fourth position in a direction different from the slide direction;
at the third position, the lock portion blocks at least a part of an insertion port on the first side of the attachment-side slide portion; and
at the fourth position, the lock portion leaves open the insertion port on the first side of the attachment-side slide portion.

10. The attachment according to claim 1, wherein the lock portion includes a projection at an end portion on the first side.

11. The attachment according to claim 1, further comprising:
a bottom surface portion having a bottom surface extending from the first surface in a direction away from the first surface; and
an elastic member on the bottom surface.

12. The attachment according to claim 11, wherein the elastic member is on the bottom surface on an opposite side from the attachment-side slide portion with respect to a center of the bottom surface.

13. The attachment according to claim 11, wherein the game controller comprises:
a reverse surface that opposes the bottom surface when the attachment is attached to the game controller;
a primary surface on an opposite side from the reverse surface; and
one or more operation section in a predetermined area of the primary surface,
wherein the elastic member is at a position opposing an area corresponding to the predetermined area on the reverse surface of the game controller with the attachment attached thereto.

14. The attachment according to claim 1, further comprising a terminal portion on the second side of the center of the attachment-side slide portion, with a surface thereof facing the first surface being exposed, wherein the terminal portion is electrically connected to a terminal of the game controller with the attachment attached thereto.

15. The attachment according to claim 1, further comprising:
a terminal that is electrically connectable to the game controller; and
a battery configured to supply power to the game controller via the terminal.

16. The attachment according to claim 1, wherein the attachment-side slide portion is a rail member that extends along the slide direction.

17. The attachment according to claim 1, wherein the attachment-side slide portion is metal.

18. The attachment according to claim 1, wherein an area of an operation surface of the attachment-side first operation button is larger than an area of the controller-side first operation button.

19. The attachment according to claim 1, wherein a tip of the first actuation portion has a curved surface.

20. The attachment according to claim 1, wherein the first actuation portion has a cross-shaped cross section along a plane perpendicular to a direction from the first position to the second position.

21. The attachment according to claim 1, wherein opposite end portions of the second surface in the slide direction are each a rounded curved surface.

22. The attachment according to claim 1, further comprising:
a light-receiving port on a bottom surface of the attachment-side slide portion;
a light-exiting port on a surface of the attachment different from the bottom surface of the attachment-side slide portion; and
a lightguide portion configured to guide light incident upon the light-receiving port to the light-exiting port.

23. The attachment according to claim 22, wherein the light-exiting port is on the second surface.

24. The attachment according to claim 22, further comprising:
a controller-side second operation button on the controller-side slide portion; and
an attachment-side second operation button on the second surface, wherein:
the attachment-side second operation button includes a second actuation portion configured to move from a fifth position to a sixth position, thereby pressing the controller-side second operation button, in response to an operation of pressing the attachment-side second operation button; and
the light-exiting port is on the second surface between the attachment-side first operation button and the attachment-side second operation button.

* * * * *